US010453216B1

(12) United States Patent
Zelenskiy et al.

(10) Patent No.: US 10,453,216 B1
(45) Date of Patent: Oct. 22, 2019

(54) AUTOMATIC CAMERA CONFIGURATION USING A FIDUCIAL MARKER

(71) Applicant: AMAZON TECHNOLOGIES, INC., Seattle, WA (US)

(72) Inventors: Lev Zelenskiy, Bundall (AU); Jon Robert Ducrou, West End (AU); Alexander Edwards, Brisbane (AU); Tony Li, Brisbane (AU); Sheng-Wei Lin, Sunnybank (AU); Stephen Waits, San Diego, CA (US)

(73) Assignee: Amazon Technologies, Seattle, WA (US)

( * ) Notice: Subject to any disclaimer, the term of this patent is extended or adjusted under 35 U.S.C. 154(b) by 184 days.

(21) Appl. No.: 15/459,583

(22) Filed: Mar. 15, 2017

(51) Int. Cl.
*G06T 7/73* (2017.01)
*G06K 9/32* (2006.01)
*G06K 9/20* (2006.01)

(52) U.S. Cl.
CPC .............. *G06T 7/74* (2017.01); *G06K 9/2063* (2013.01); *G06K 9/325* (2013.01); *G06K 2209/15* (2013.01); *G06T 2207/30208* (2013.01); *G06T 2207/30244* (2013.01)

(58) Field of Classification Search
None
See application file for complete search history.

(56) References Cited

U.S. PATENT DOCUMENTS

2007/0057817 A1* 3/2007 Aman .................... G08G 1/017 340/933
2009/0196456 A1* 8/2009 Bisti ........................ G06F 21/36 382/100
2013/0063592 A1* 3/2013 Kingsley ................ H04N 7/181 348/143
2014/0214500 A1* 7/2014 Hudson .............. G06Q 30/0284 705/13
2016/0306535 A1* 10/2016 Krishnamoorthy ....... G06T 7/73

* cited by examiner

*Primary Examiner* — Vu Le
*Assistant Examiner* — Tracy Mangialaschi
(74) *Attorney, Agent, or Firm* — Kilpatrick Townsend & Stockton LLP

(57) ABSTRACT

Systems and associated methods are disclosed for automatically configuring cameras to be associated with a known physical location in response to exposing the camera to a fiducial marker. In certain embodiments, boundaries for a zone of interest within images from the camera can be defined using the fiducial markers physically placed within the physical space.

20 Claims, 15 Drawing Sheets

502 RECEIVE A COMMAND TO ENTER A CAMERA CONFIGURATION MODE FROM A CONCIERGE TOOL
504 DISPLAY A FIRST FIDUCIAL MARKER ON THE CONCIERGE TOOL
506 CAPTURE, WITH A FIRST CAMERA, A FIRST IMAGE INCLUDING A FIRST KNOWN PHYSICAL LOCATION AND A FIRST FIDUCIAL MARKER
508 DETECT THE FIRST FIDUCIAL MARKER WITHIN THE FIRST IMAGE
510 DETERMINE THE FIRST KNOWN PHYSICAL LOCATION
512 AUTOMATICALLY ASSOCIATE THE FIRST CAMERA WITH THE FIRST KNOWN PHYSICAL LOCATION
514 ASSOCIATE SUBSEQUENT IMAGES FROM THE FIRST CAMERA WITH THE FIRST KNOWN PHYSICAL LOCATION
516 CAPTURE A SECOND IMAGE INCLUDING A LICENSE PLATE
518 PERFORM AN AUTOMATIC LICENSE PLATE RECOGNITION (ALPR) PROCESS ON THE SECOND IMAGE TO DETERMINE A LICENSE PLATE IDENTIFICATION OF THE LICENSE PLATE
520 ASSOCIATE THE LICENSE PLATE IDENTIFICATION WITH THE FIRST KNOWN LOCATION
500

1302
2200
2202
2102
2204

AUTOMATIC CAMERA CONFIGURATION USING A FIDUCIAL MARKER

BACKGROUND

Cameras, such as security cameras, are often used to monitor locations. In some environments, a system may need to know the physical location of the area that the camera is monitoring. However, when a camera needs to be replaced or added to a system, the process to configure the camera to associate the camera with the physical location can be time and labor intensive. For example, a network engineer may need to search for a network camera and manually manipulate or alter the configurations of the system to account for the newly added camera. Further, by requiring manual manipulation of the configurations of the systems in these regards, the system becomes susceptible to additional misconfiguration as manually altering configurations can introduce errors into the system.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Figure 1:
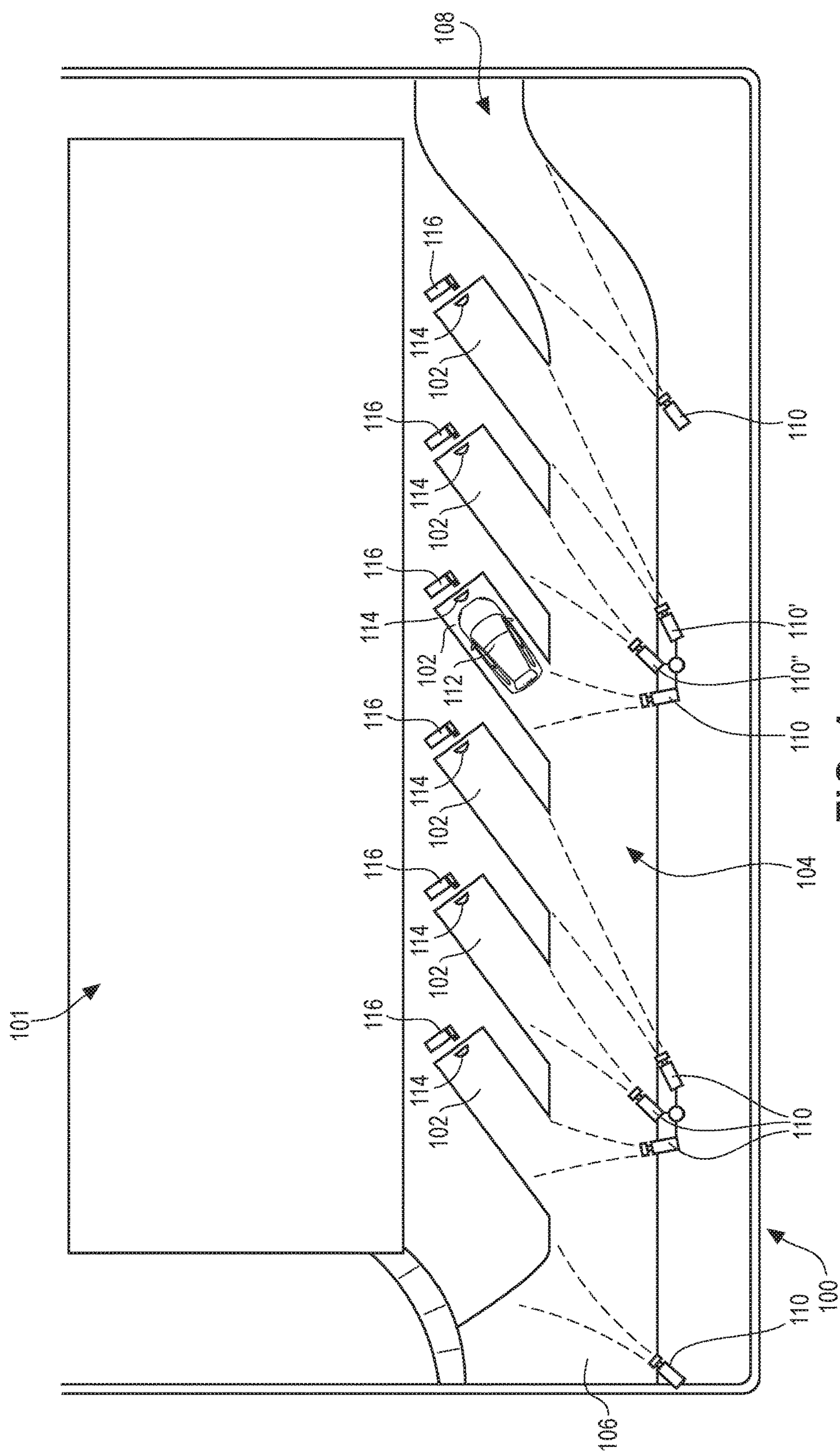
FIG. 1 is a diagram of an example pick-up location site configured in accordance with various embodiments.

In example embodiments described herein, methods and associated systems are disclosed to quickly configure cameras with a fiducial marker. A system receiving images from the camera can detect the fiducial marker within an image from the camera and can resultantly configure that camera in a variety of ways. In one approach, a fiducial marker can be used to associate a camera, or more specifically, a field of view of the camera, with a physical location such as a particular parking bay within a parking lot. The fiducial marker can be displayed on a concierge tool or other user device and subsequently exposed to a particular camera that a user would like to configure. In this manner, a user can quickly enable configuration of the particular camera simply by showing the camera the fiducial marker rather than through altering network settings or other configurations. These teachings are particularly useful when a plurality of cameras are in use at a location or on a network. Thus, once a single camera of a plurality of cameras is physically identified, simply exposing the fiducial marker to the camera will place the camera into configuration mode, as opposed to searching through potentially hundreds of different network devices to find the particular physical camera. The methods and systems described herein allow for identification of a physical camera and subsequent association of that physical camera with a physical location using a physical process involving fiducial markers. This physical process eliminates the need to enter the virtual world of behind-the-scenes network device configurations. Further, from the perspective of a user, the process to configure a camera is simple and eliminates the need for network management knowhow and experience. Instead, the user simply performs the processes disclosed herein and the system automatically configures the camera and its associations. Although many of the embodiments herein discuss configuration of cameras, for example, during an initial configuration, the teachings disclosed herein can also be utilized to place a camera or the associated system into a configuration mode to perform maintenance processes, adjustments, calibrations, and/or verification processes to ensure the camera and the overall system are correctly configured. Other uses and variations are possible.

These teachings may be utilized in various settings. One such setting is in an order pick-up location that is populated with one or more cameras configured to capture images of the license plate of vehicles entering or parked within an order pick-up parking bay. The captured images are used in an automatic license plate recognition (ALPR) process to identify the vehicle and an associated customer. Upon identification of the customer's vehicle, the customer pick-up order may be delivered to their vehicle parked within the specific parking bay. In such an environment, many cameras may be utilized to capture images of each of the parking bays. Each camera may be associated with one (or more) particular parking bay. When a particular camera detects and identifies a license plate within its field of view, that detection event will be associated with the particular parking bay. So configured, the system can provide a concierge with the particular parking bay for delivery of the pick-up order so that the correct order is provided to the correct vehicle.

Associating cameras with a particular physical location can prove to be a technical problem without the requisite familiarity or expertise with the specific network, network devices, or network architectures in general. However, presented herein are various technical improvements directed to streamlining and simplifying the camera configuration process to improve the speed at which cameras are configured and to reduce the potential for error.

Referring now to the figures, FIG. 1 illustrates an example pick-up location site 100 configured in accordance with various embodiments. The pick-up location site 100 includes a building 101 for storing groceries or goods for pick-up by or delivery to customers. The pick-up location site 100 also includes multiple parking bays 102 (e.g., parking spots, parking spaces, parking pads, parking lanes, parking stalls, drive-through lanes, standing zones, or other suitable parking or idling locations) adjacent to or near the building 101. The parking bays 102 may be accessible by a lane 104, and may be parallel, perpendicular, or angled parking bays in relation to the traffic direction of the lane 104. The lane 104 may include an entrance 106 and an exit 108 to provide access to the lane 104 from one or more adjacent roads (e.g., streets, highways, or other traffic-bearing roads). In different configurations, the entrance 106 and the exit 108 may be the same location, as opposed to the drive-through configuration illustrated in FIG. 1. In still other embodiments, the parking bays 102 may be accessible directly from the road without the use of a lane 104, such as typical parallel, perpendicular, or angled parking spots along the side of a road. One of skill in the art will readily understand that suitable parking configurations can vary depending on the needs or surroundings of the particular pick-up location, which various configurations are contemplated herein.

In various embodiments, cameras 110 are positioned on or around the pick-up location site 100 in various locations. The cameras 110 may be any known camera type, including security cameras, box cameras, dome cameras, pan-tilt-zoom (PTZ) cameras, bullet cameras, day/night cameras, infrared cameras, or other suitable camera types. The cameras 110 are configured such that each camera 110 captures an image of a respective parking bay 102. More specifically, each camera 110 may be specifically aimed, zoomed, and focused to capture an image of an approximate location of the rear of a vehicle 112 when the vehicle 112 is parked within the parking bay 102. Cameras 110 may be mounted on poles, buildings, or other structures such that the cameras 110 capture images of the rear of the vehicle 112 when parked in the parking bay 102. The cameras 110 include a first camera 110' and a second camera 110" 110".

In some embodiments, each individual camera 110 is configured to capture images for a single parking bay 102. In other embodiments, some or all cameras 110 may be configured to capture images for multiple parking bays 102. For example, the images produced by the camera 110 may be partitioned or masked to account for the different parking bays 102. Alternatively still, some or all cameras 110 may move or pivot to capture different parking bays 102 at different times. Many variations are possible.

In certain embodiments, other cameras 110 may be provided in other locations to capture images of vehicle license plates as a vehicle enters the pick-up location site 100. For example, a camera 110 may be positioned to capture images of license plates as vehicles drive through the entrance 106. As discussed herein, determining the identity of the vehicle at the entrance 106 may begin the pick-up order fulfillment or delivery process before the vehicle even parks in a parking bay 102 to further reduce customer wait times. In another example, a camera 110 may be positioned to capture images of license plates as vehicles drive through the exit 108 to enable the system to further verify that a vehicle has exited a parking bay 102 and/or the pick-up location site 100.

Additionally, each parking bay 102 may include a proximity sensor 114. The proximity sensor 114 may be positioned within or around the parking bay 102 to detect a vehicle 112 when the vehicle 112 is within the parking bay 102. The proximity sensor 114, also called a parking sensor, may be any known proximity sensor including, without limitation, an ultrasonic detector, an electromagnetic detector, an inductive detector loop, a magnetic detector, an infrared or laser beam detector, a motion sensor, a time-of-flight sensor, or a radar detector. Other sensor types may be used to detect the presence of a vehicle instead of, or in addition to, a proximity detector, including pressure pads, treadle switches, radio-frequency identification (RFID) sensors, or other sensor or switch types. The proximity sensor 114 may be positioned in any suitable location within or around the parking bay 102 as may be best suited for the particular sensing technology and/or the particular proximity sensor product. For example, the proximity sensor 114 may be affixed to or embedded within the ground surface under or around the vehicle 112 when the vehicle 112 is parked in the parking bay. The proximity sensor 114 may be positioned in front of the parking bay 102 and/or elevated off the ground so that the proximity sensor 114 can detect the vehicle 112 as it pulls into the specific parking bay 102. One of skill in the art will readily understand that many different proximity sensor types and installation locations may be possible and are compatible with the teachings herein.

Figure 2:
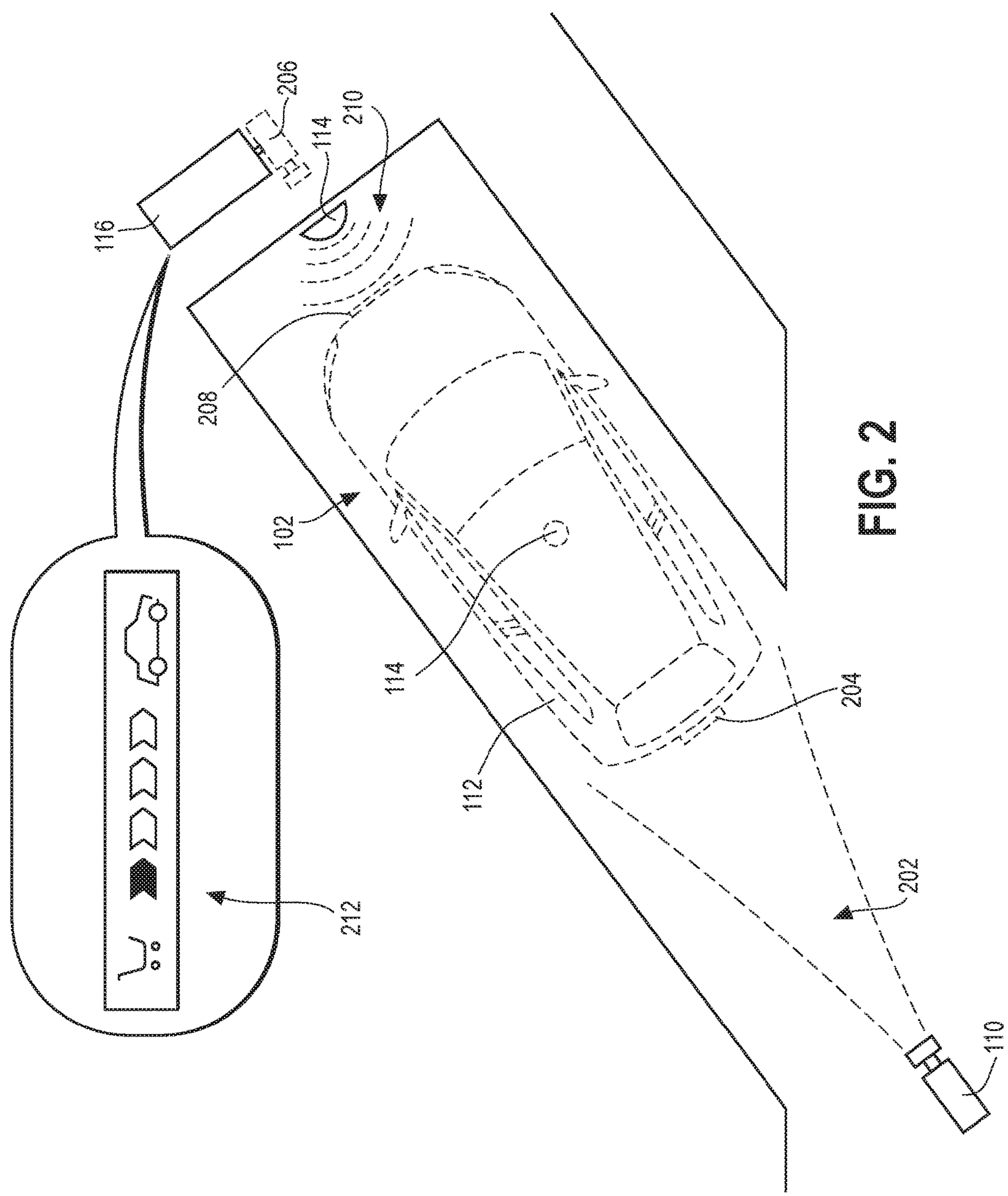
FIG. 2 is a diagram of an example parking bay within the pick-up location site of FIG. 1 configured in accordance with various embodiments.
Figure 13:
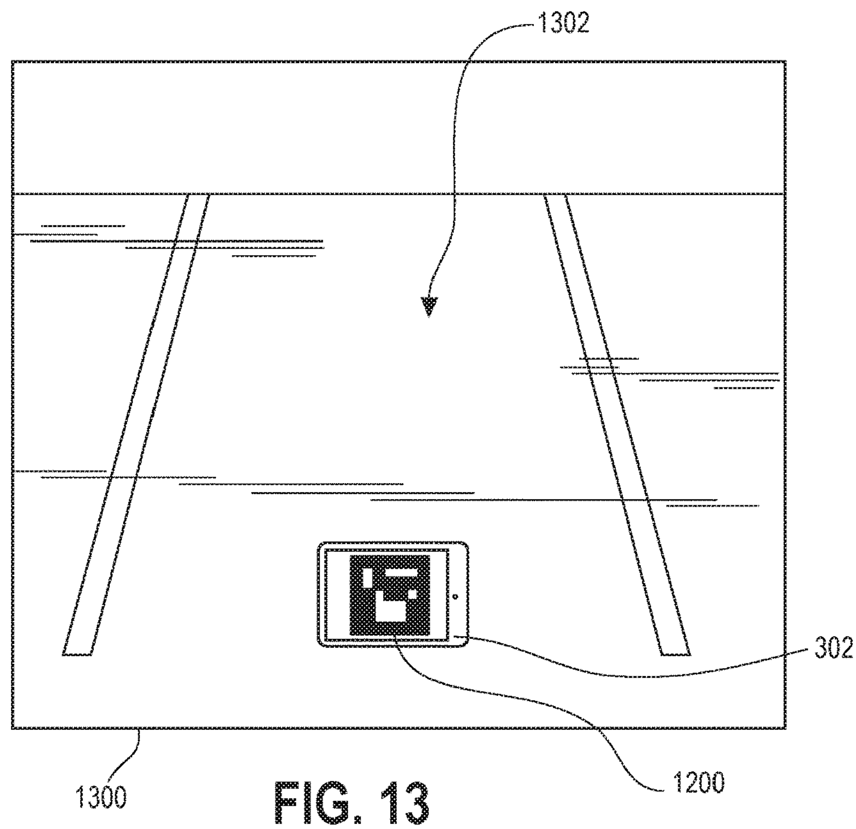
FIG. 13 is an example image of the field of view of a camera in accordance with various embodiments.

FIG. 2 illustrates a more detailed view of the parking bay 102 with a vehicle 112 parked therein. As discussed above, a camera 110 is aimed such that the rear of the vehicle 112 is within the field of view 202 of the camera 110. More specifically, the camera 110 is configured (aimed, zoomed, or focused) to focus on a rear license plate 204 of a vehicle 112 when the vehicle 112 is parked in the parking bay 102 within the field of view 202. An example of the field of view of the camera 110 is illustrated in FIG. 13, showing an example image 1300 that the camera 110 may capture. In certain embodiments, a front camera 206 may be positioned to capture images of the vehicle 112 within the parking bay 102 from an additional or different angle or viewpoint. In one approach, the front camera 206 may be positioned at the front of the parking bay 102 to capture an image of a front license plate 208 of the vehicle 112. Having two images of the different license plates 204 and 208 of the vehicle 112 may serve to increase accuracy of vehicle detection using ALPR.

The parking bay 102 also includes one or more proximity sensors 114 that can detect the presence of the vehicle 112 within the parking bay 102, for example, using electromagnetic, ultrasonic, or optical waves 210. Alternatively, the proximity sensor 114 could be placed on the ground surface near the center (or elsewhere) of where a vehicle 112 parks within the parking bay 102. Many variations are possible.

Although the various embodiments are discussed herein in the context of a pick-up location site 100, one of ordinary skill in the art will understand that such environments are merely examples of suitable environments and that the teachings disclosed herein may be suitable for any environment utilizing cameras requiring configuration. Further, configuration of the cameras is not limited to associating the camera 110 with a physical location and may include adjusting other aspects of the camera 110, including its picture, network configurations, or other settings.

Figure 3:
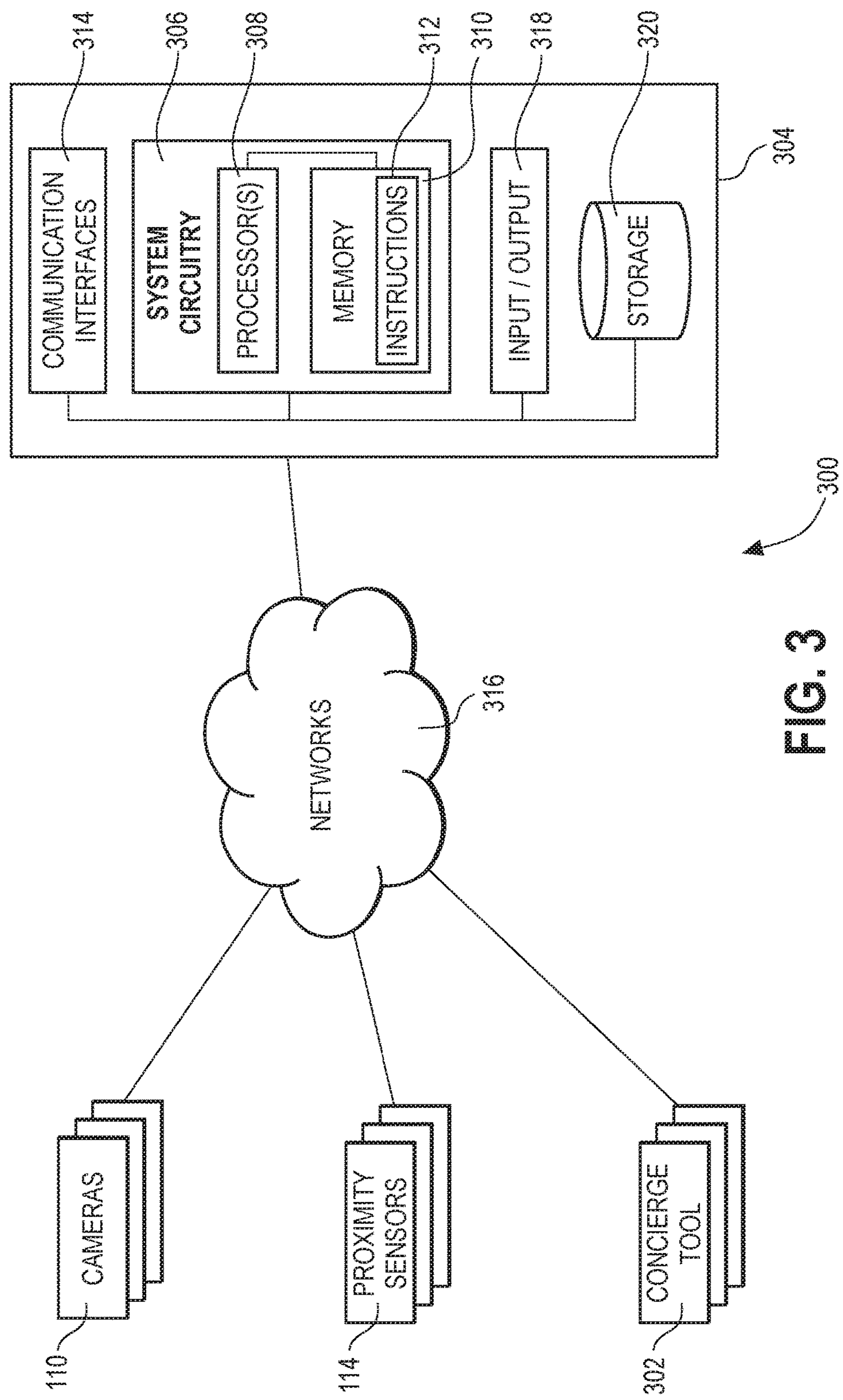
FIG. 3 is a block diagram of an example implementation of a system for configuring cameras for use with parking bays in accordance with various embodiments.

FIG. 3 illustrates a block diagram of an example implementation of a system 300 for configuring cameras in accordance with various embodiments. The system 300 includes the cameras 110 and, optionally, the proximity sensors 114. The system 300 also includes the concierge tool 302. The concierge tool 302 may include an electronic user device, such as a portable computer, a tablet computing device, a smartphone, a digital media device, an eBook reader, a laptop or netbook computing device, a wearable computing device, an augmented reality device, a helmet, goggles or glasses, or any other suitable electronic user device. The electronic user device may also include software or applications (e.g., an ANDRIOD or IOS application) to enable interaction with the system 300 using a graphical user interface (GUI) or a non-graphical user interface. The concierge tool 302 is operated by human concierge users to interface with the system 300 to receive and provide instructions or information such as commands to enter into a camera configuration mode. Multiple concierge tools 302 may be included as part of the system 300, which may include one or more concierge tools 302 used by multiple human concierge users at a pick-up location site 100.

In various embodiments, the system 300 includes one or more servers 304 with which the cameras 110, the proximity sensors 114, and the concierge tool 302 communicate. In various embodiments, the servers 304 may include a single server or may include multiple co-located or remote servers. In certain examples, the servers 304 may be implemented in whole or in part within a cloud-computing environment or cluster, for example, within an AMAZON WEB SERVICES™ (AWS) cloud-computing environment and/or, more specifically, using AMAZON ELASTIC COMPUTE CLOUD™ (EC2) instances within an AMAZON VIRTUAL PRIVATE CLOUD™ (VPC). Various processes and modules may be partitioned and executed by different servers within the cloud-computing environment.

These servers 304 may include system circuitry 306, which may further include one or more processors 308, memory 310, and/or other circuitry. The processors 308 may include one or more processors within a single server or distributed across multiple servers or systems, for example, in a cloud-computing environment or a multiple server configuration. The memory 310 may comprise a memory system including a plurality of memory devices or other computer-readable media collocated or distributed across multiple servers or systems. The memory 310 may store control instructions 312 and/or operational parameters, datasets, and other information. The instructions 312 may correspond to the various elements illustrated in FIG. 4, as well as the various method steps illustrated in FIGS. 5-10. As such, in certain embodiments, the memory 310 may be considered computer readable media with instructions stored thereon for execution by the processors 308 to cause the processors 308 to perform a multitude of steps described herein. The processors 308 may be connected to the memory 310 and may execute the control instructions 312 to implement any of the functions described herein. For example, the system circuitry 306, including the processors 308 and the memory 310, may implement, in whole or in part, some or all of the modules, elements, functions, processes, methods, and/or features described herein. So arranged, the system circuitry 306, the processors 308, and/or the servers 304 are each configured to perform the processes and functions disclosed herein.

The servers 304 may also include communication interfaces 314 to enable the servers 304 to communicate with each other and with the cameras 110, the proximity sensors 114, and the concierge tool 302 across the networks 316. The servers 304 may also include one or more input/output devices 318, for example, to enable local maintenance engineers to interact with the servers 304. The servers 304 may include a storage device 320, which may comprise one or more hard drive discs, memory devices, or multiple other storage devices configured to store databases, customer data, order data, and other mass data. The storage device 320 may be internally maintained within the servers 304 or remotely maintained and accessible by the servers 304 via the networks 316. The storage device 320 may include copies of the instructions 312 or other data or instructions used by the servers 304 to implement the functions and features described herein.

The networks 316 may include any network connecting the various devices together to enable communication between the various devices. For example, the networks 316 may include the Internet, an intranet, a local area network (LAN), a virtual LAN (VLAN), or any combination thereof. The networks 316 may be wired or wireless and may implement any protocol known in the art. Specific network hardware elements required to implement the networks 316 (such as wired or wireless routers, network switches, broadcast towers, and the like) are not specifically illustrated; however, one of skill in the art recognizes that such network hardware elements and their implementation are well known and contemplated. For example, in a cloud-computing environment, the cameras 110, the proximity sensors 114, and/or the concierge tool 302 may communicate on a LAN (e.g., a VLAN) with a local router physically located at the pick-up location site. The local router may in turn enable communication with the physically remote cloud-computing environment (e.g., servers 304), for example, via the Internet. Other variations are possible.

Figure 4:
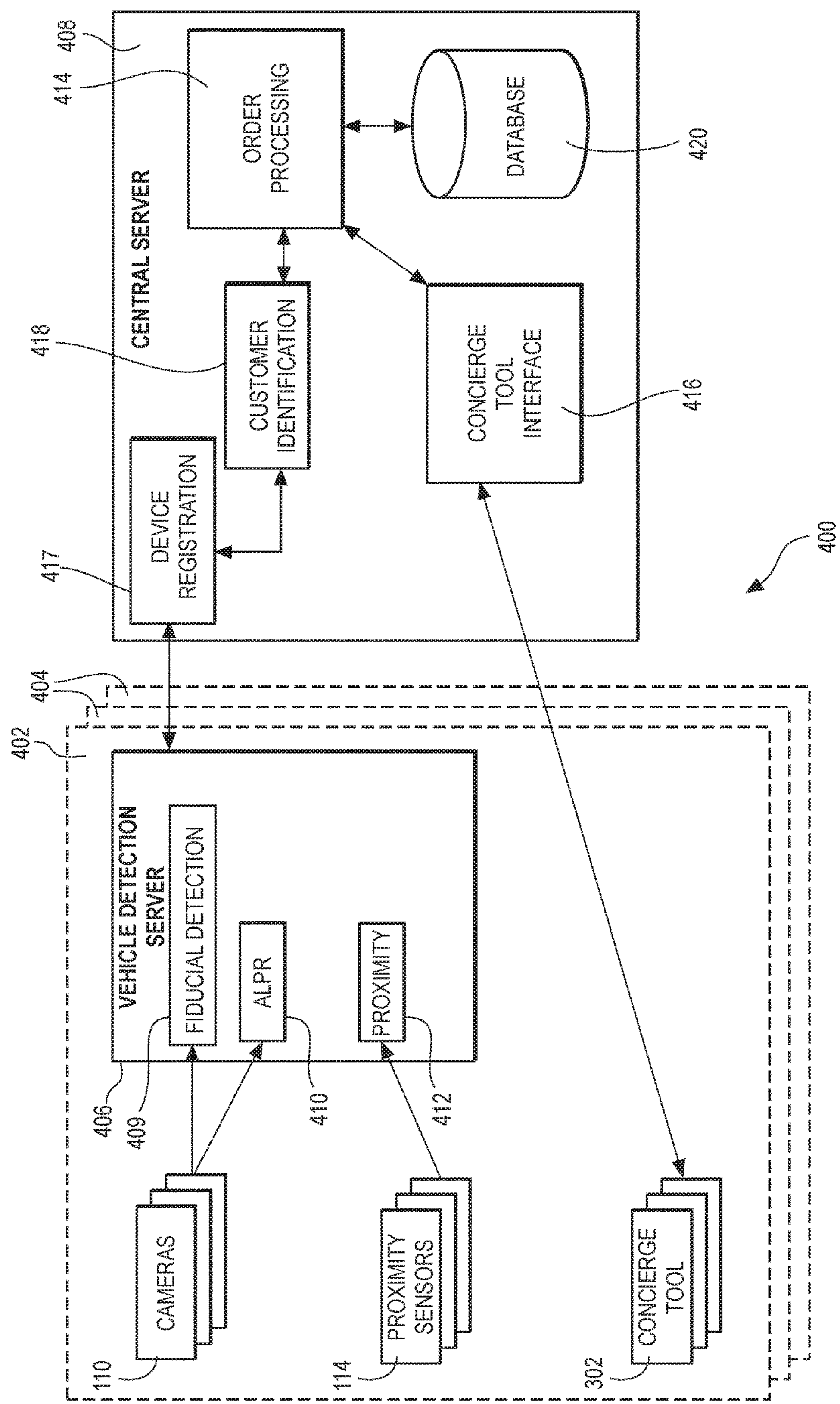
FIG. 4 is a block diagram of an example architecture for a system for configuring cameras for use with parking bays in accordance with various embodiments.

FIG. 4 illustrates a block diagram of an example system architecture for the system 400 for configuring cameras in accordance with various embodiments. In certain embodiments, system 400 is the same as system 300, however, the block diagram of FIG. 4 highlights the logical or functional architecture of the system 400 whereas FIG. 3 highlighted many of the hardware aspects. The logical or functional architectural elements illustrated in FIG. 4 may be implemented by or on the system 300 of FIG. 3, specifically by the servers 304, the system circuitry 306, and/or the processors 308.

FIG. 4 illustrates the cameras 110, the optional proximity sensors 114, and the concierge tool 302 as associated with a pick-up location site 402. There may be other pick-up location sites 404 associated with other physical pick-up location sites that have a similar system architecture as is shown for pick-up location site 402 (possibly with a different number of cameras 110, proximity sensors 114, and/or concierge tools 302).

The pick-up location site 402 may include or be associated with a vehicle detection server 406. The vehicle detection server 406 may be a local physical server (such as servers 304) located at or near the physical pick-up location site 100. Alternatively, the vehicle detection server 406 may be instantiated on a remote cloud-computing environment, such as within AMAZON EC2. In such a configuration, the vehicle detection server 406 may not be physically located at the pick-up location site 100, but may be logically associated with or dedicated to the physical pick-up location site 402. A different vehicle detection server 406 may be instantiated on the cloud-computing environment for each of the other physical pick-up location sites 404, as well, to handle the operation and information from cameras 110 and proximity detectors 114 at those other sites.

The different vehicle detection servers from each pick-up location site 402 or 404, including vehicle detection server 406, each communicate with a central server 408. In this manner, the central server 408 can communicate with all of the different pick-up location sites 402 and 404 to control high-level operations and to provide and receive information that is centrally maintained and used for operations of each of the pick-up location sites 402 and 404. Such operations may include recognition of various network devices such as cameras 110.

Figure 12:
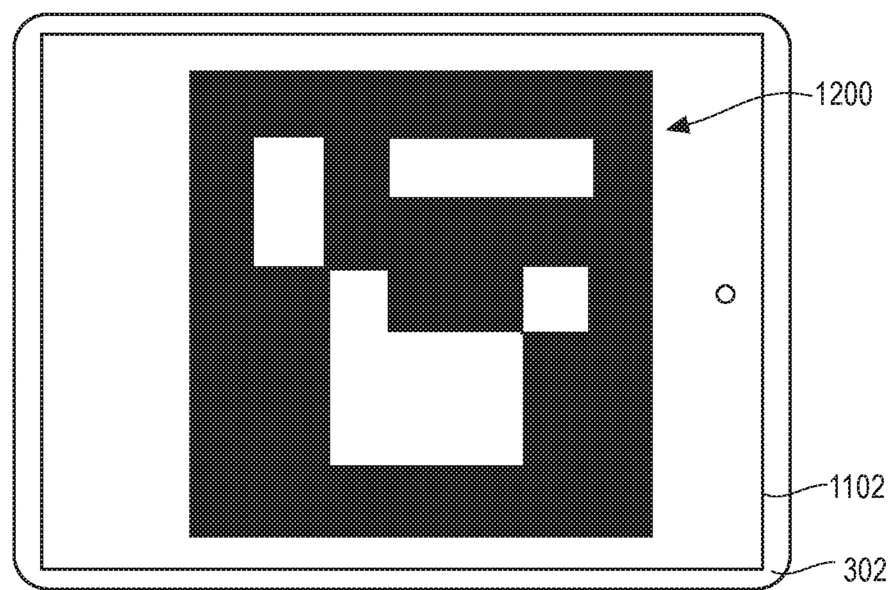
FIG. 12 is an example of a concierge tool displaying a fiducial marker in accordance with various embodiments.

The vehicle detection server 406 may include a fiducial detection module 409, including fiducial detection circuitry (such as processors 308 and instructions 312) that executes a fiducial marker recognition process to recognize fiducial markers in images received from the cameras 110. In one embodiment, the fiducial detection module 409 implements the open source software ARToolKit and its associated AR Marker Library to detect augmented reality (AR) fiducial markers (an example of which is shown in FIG. 12). Alternatively, the fiducial detection module 409 implements software to recognize Quick Response (QR) codes. Alternatively still, the fiducial detection module 409 implements other software to detect other fiducial markers. In particular, the fiducial detection module 409 receives images from the cameras 110 and detects fiducial markers in the received images. In one embodiment, the fiducial detection module 409 operates continuously to constantly scan received images for fiducial markers. In another embodiment, the fiducial detection module 409 is activated after receipt of a command to enter a camera configuration mode received from the concierge tool. The fiducial detection module 409 may remain active for a suitable period of time, e.g., 5 minutes, after receipt of the command to enter the camera configuration mode, or may remain active until exited at the concierge tool 302. The fiducial detection module 409 may be configured to search only for one or more particular fiducial markers (e.g., one or more particular AR codes or QR codes), or may be responsive to any detectable fiducial markers. The fiducial detection module 409 may communicate any detections of fiducial markers and/or specific information or values embedded within the detected fiducial markers to a device registration module 419, discussed below.

In alternative embodiments, the fiducial detection module 409 may be implemented on the cameras 110 themselves (e.g., executed on processors within the cameras 110) and the results of the fiducial marker detection process (e.g., positive identifications and/or embedded information) are transmitted to the vehicle detection server 406. In such an arrangement, network traffic between the cameras 110 and the vehicle detection server 406 can be greatly reduced by sending data corresponding to recognized fiducial markers instead of video feeds, which are much data intensive. In such an embodiment, the camera 110 performing the fiducial marker detection process may also function as a server or operate as part of the server 304.

The vehicle detection server 406 may also include an automatic license plate reading (ALPR) module 410, including ALPR circuitry (such as processors 308 and instructions 312) that executes an ALPR process to read license plates in images received from the cameras 110. In one embodiment, the ALPR module 410 implements the open source software OpenALPR to perform the ALPR process. In particular, the ALPR module 410 receives images from an individual camera 110, detects a license plate in the image, and performs an optical character recognition process to determine the characters in the license plate. The ALPR module 410 may receive multiple images over time (such as frames of a video) and may perform the ALPR process for each image to acquire a more accurate determination of the characters in the license plate. After performing the ALPR process, the APLR module 410 outputs one or more candidate license plate identifications. Those candidate license plate identifications are subsequently communicated to the central server 408, and specifically to the customer identification module 418, discussed below. The ALPR module 410 can account for a license plate that remains within the image and, in accordance with various approaches, will only output a new candidate license plate identification when the ALPR module 410 detects a new license plate in the image.

In alternative embodiments, and like the fiducial detection module 409, the ALPR module 410 may be implemented on the cameras 110 themselves (e.g., executed on processors within the cameras 110) and the results of the ALPR process (e.g., candidate license plate identifications) are transmitted to the vehicle detection server 406. In such an arrangement, network traffic between the cameras 110 and the vehicle detection server 406 can be greatly reduced by sending data corresponding to recognized license plates instead of video feeds, which include much data intensive. In such an embodiment, the camera 110 performing the ALPR process may also function as a server or operate as part of the server 304.

In an optional embodiment, the vehicle detection server 406 also includes a proximity interface module 412 including proximity interface circuitry (such as processors 308 and instructions 312) that executes a proximity interface process to poll proximity sensors 114 and interpret the received proximity data accordingly and output a state of the proximity sensor 114 (e.g., "present" or "non-present").

The central server 408 communicates with the vehicle detection server 406 and the concierge tool 302. In one approach, the central server 408 receives and sends messages to and from the vehicle detection server 406 using AMAZON Simple Notification Service (SNS) messages and Simple Queue Service (SQS) messages, though other messaging and communication schemes or protocols are possible. The central server 408 may perform the processes to configure the cameras 110 or other devices (such as proximity sensors). The central server 408 may also perform the necessary processes to identify vehicles or customers, associate pick-up orders with customers, process orders received from customers (e.g., online orders), coordinate pick-up order fulfillment and delivery workflows, and communicate with human concierge users or other individuals at the pick-up location site 100. The central server 408 may include an order processing module 414, a concierge tool interface 416, a customer identification module 418, and a database 420. The order processing module 414 handles customers' pick-up orders and coordinates efforts to fulfill the pick-up orders. The database 420 includes data corresponding to the customers (including license plate identifications or license plate hash values), pending and past pick-up orders, and the multiple pick-up location sites 402 and 404.

The concierge tool interface 416 may implement a gateway service between the device registration module 419 and the concierge tool 302 to allow the device registration module 419 to communicate with the concierge tool 302. Optionally, the communication between the device registration module 419 and the concierge tool interface 416 may be through the order processing module 414 or another module. Further, the order processing module 414 may communicate with the concierge tool 302 via the concierge tool interface 416. In one approach, the concierge tool interface 416 may provide a representational state transfer (REST) interface. The concierge tool 302 may communicate with the concierge tool interface 416 via the networks 316 to send and receive data and instructions regarding the camera configuration process. A human user may use the concierge tool 302 to initiate a camera configuration mode and/or to provide input as to known physical locations (e.g., specific parking bays) with which the camera should be associated. Further, the concierge tool 302 may receive configuration instructions to provide to the human user during a camera configuration process. Additionally, the concierge tool 302 may receive images or video streams captured by a camera 110 to provide the user with a field of view of the camera 110. The images or video streams may be received through the concierge tool interface 416, or may be locally received via the local network.

In one embodiment, the concierge tool 302 may communicate with the concierge tool interface 416 via the networks 316 to send and receive data representative of a pick-order fulfillment workflow when the concierge tool 302 is in an operational mode. For example, a human concierge user will utilize the concierge tool 302 to manually check in customers into a parking bay 102 for pick-up of a pending pick-up order (for example, if the customer identification module 418 fails to identify the vehicle and corresponding customer). The concierge tool 302 can provide instructions or information to the human concierge user to help fulfill and deliver the pick-up order. Once the pick-up order is completed (e.g., delivered), the human concierge user can provide a manual input to the concierge tool 302 to indicate that the pick-up order has been completed. The concierge tool 302 can communicate the manual indication that the pick-up order is completed to the order processing module 414 via the networks 316 and the concierge tool interface 416.

The device registration module 419 may include device registration circuitry (such as processors 308 and instructions 312) that executes a device configuration process such as a camera configuration process. In one embodiment, the device registration module 419 receives from the fiducial detection module 409 identifications of particular devices on a network (e.g., cameras 110), indications that a fiducial marker has been detected within an image from one or more cameras, and/or embedded information within a recognized fiducial marker. Additionally, the device registration module 419 may receive from the concierge tool 302 a command to enter a camera configuration mode and/or selection of one or more particular known physical locations (e.g., parking bays) to which a camera 110 is to be associated. With this information, the device registration module 419 can automatically associate a particular camera 110 with a particular known physical location. Stated another way, the device registration module 419 can store (e.g., in a lookup table or other database structure) an association between images or ALPR results received from a particular camera 110 and a particular known physical location (e.g., a specific parking bay). In this manner, during operation, the device registration module 419 can associate subsequent received images or ALPR results with the particular parking bay. This information can be used by the customer identification module 418 to associate a recognized customer with the parking bay, as discussed below.

The customer identification module 418 may include customer identification circuitry (such as processors 308 and instructions 312) that executes a customer identification process. In one embodiment, the customer identification module 418 receives one or more candidate license plate identifications (or candidate license plate identification hash values) from the vehicle detection server 406. The customer identification module 418 then checks the received candidate license plate identifications against know license plate identifications already associated with customers and stored in the database 420. The customer identification module 418 also checks whether the identified customer corresponding to the candidate license plate has any pending pick-up orders and automatically checks in the customer and the vehicle for pick-up of the pending pick-up order. If there is no corresponding known license plate identification or no corresponding pending pick-up order, the concierge tool interface 416 can send a message to the concierge tool 302 prompting the human concierge user to manually check in the vehicle and customer parked at the specific parking bay 102.

FIGS. 5-10 show example flow diagrams of logic that the servers 304, the processors 308, or various ones of the modules or circuitry elements illustrated in FIGS. 3 and 4 may implement to provide features of the camera configuration processes discussed herein. In describing the following flow diagrams, reference is made to other figures within the application to provide illustrative examples and explanations of the various steps.

Figure 5:
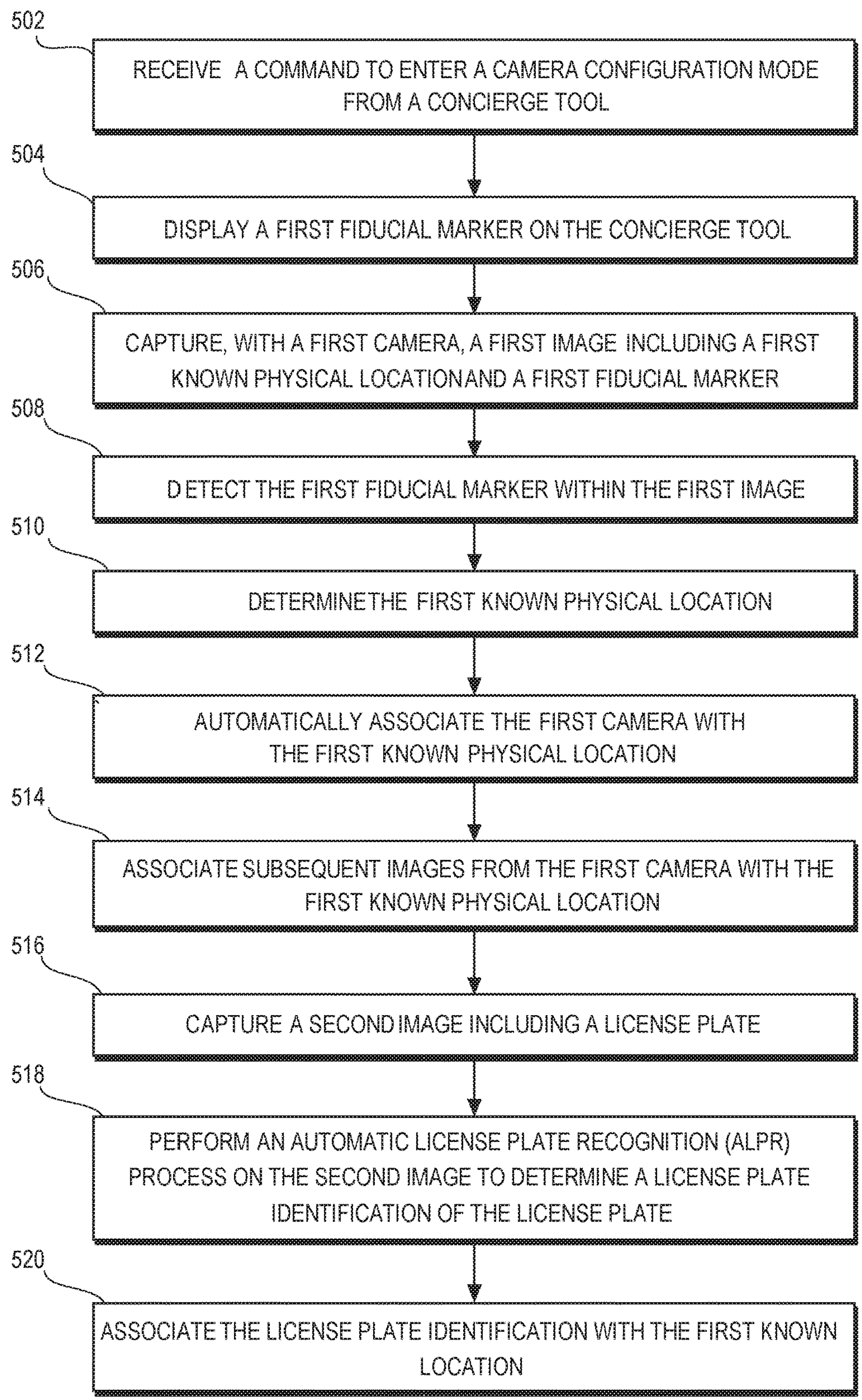
FIG. 5 is an example flow diagram of logic to configure a camera in accordance with various embodiments.

FIG. 5 shows an example flow diagram of logic 500 to configure a camera 110 in accordance with various embodiments. At step 502, the servers 304, and specifically the concierge tool interface 416, receives a command to enter a camera configuration mode from a concierge tool 302.

Figure 11:
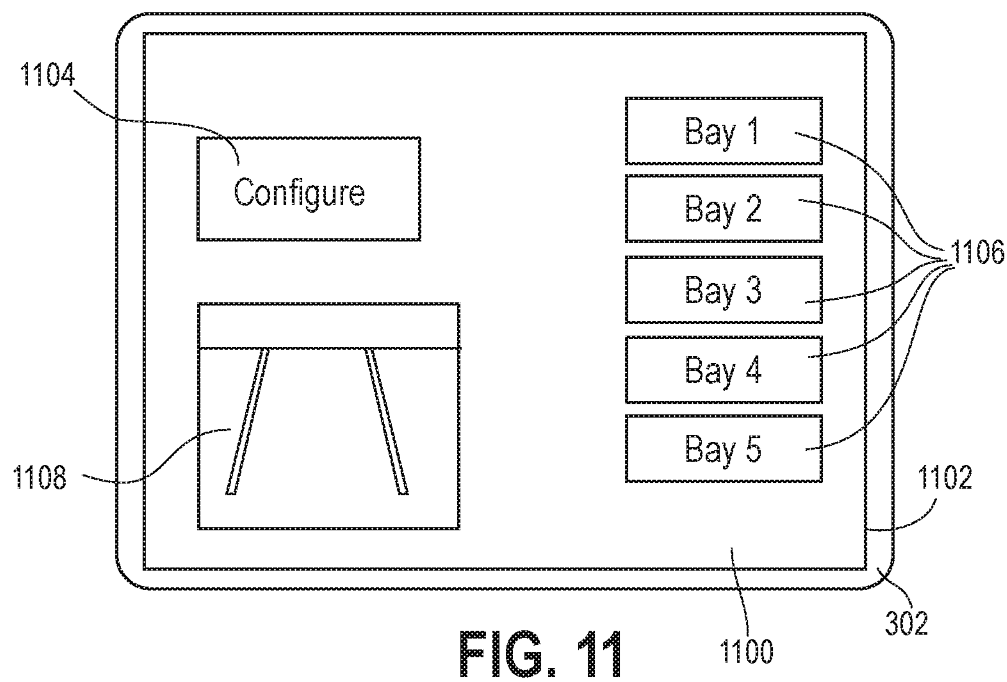
FIG. 11 is an example graphical user interface (GUI) provided on a display device of the concierge tool in accordance with various embodiments.

FIG. 11 shows an example graphical user interface (GUI) 1100 provided on a display device 1102 of the concierge tool 302. The GUI 1100 provides a user of the concierge tool 302 with various selectable options to configure the cameras 110. A configure button 1104 or other input is provided to place the system into a camera configure mode. Other buttons are provided, including a plurality of location buttons 1106 or other inputs that enable a user to select a particular known physical location with which a camera 110 is to be associated. In this example, the location buttons 1106 each correspond to a particular parking bay, such as parking bays 1-5. Operation of these location buttons 1106 is discussed further below. The GUI 1100 may also include a reference image 1108 or video stream from a particular camera 110, for example, the camera 110 subject to the camera configuration process. The reference image 1108 may represent the field of view of the particular camera 110 (showing an empty parking bay, in this example). Once a user presses or activates the configured button 1104, the concierge tool 302 sends a command to the servers 304 to enter the camera configuration mode.

Returning briefly to FIG. 5, at step 504, the servers 304, and specifically the concierge tool interface 416, instruct the concierge tool 302 to display the first fiducial marker 1200 on the display device 1102 of the concierge tool 302. FIG. 12 shows the concierge tool 302 displaying the fiducial marker 1200 on the display device 1102. The example fiducial marker 1200 shown is an Augmented Reality (AR) code, however other types of fiducial markers 1200 may be used, including Quick Response (QR) codes, high-contras symbols or images, or even an image of a license plate with a particular license plate string. Many variations are possible.

At step 506, a first camera 110' captures a first image. The first image includes at least a portion of a field of view of the first camera 110' including a first known physical location and a first fiducial marker. FIG. 13 illustrates an example image 1300 of the field of view of the first camera 110'. The image 1300 shows a known physical location, being a known parking bay 1302 in this example. The image 1300 also includes the concierge tool 302 displaying the fiducial marker 1200.

A user (not shown) can hold the concierge tool 302 with the display fiducial marker 1200 in front of the first camera 110' that the user wishes to configure so that the first camera 110' can see the fiducial marker 1200. In some embodiments, the fiducial marker 1200 needs simply to be anywhere within the field of view of the first camera 110' for recognition to occur (step 508). In other embodiments, the fiducial marker 1200 should be held or presented to the particular camera 110 near the center of the field of view for the first camera 110'. In environments that include multiple cameras 110 aimed at multiple different locations, it may be beneficial to hold the fiducial marker 1200 close to the location with which the first camera 110' is ultimately concerned so as to avoid multiple cameras being exposed to the fiducial marker 1200. In this example, the user can hold the concierge tool 302 with the fiducial marker 1200 close to where a rear license plate may exist on a vehicle if the vehicle were to be parked in the parking bay 1302. Alternatively, the user can hold the fiducial marker 1200 closer to the first camera 110' to avoid other cameras 110 from seeing the fiducial marker 1200. Different approaches may be suitable in different environments to expose the fiducial marker 1200 to the first camera 110' to enable configuration of the first camera 110'.

Returning to FIG. 5, at step 508, the servers 304, and specifically the fiducial detection module 409, receive the first image and perform a fiducial detection process on the image to detect the first fiducial marker 1200 within the first image. Upon successful detection of the fiducial marker 1200, the fiducial detection module 409 may communicate the result of the detection (e.g., the detection event, the identification of the camera that was exposed to the fiducial marker 1200, and/or data embedded within the first fiducial marker 1200) to the device registration module 419 at the central server for further processing.

At step 510, the servers 304, and specifically the device registration module 419, determines the first known physical location from a plurality of known physical locations. In this example, the device registration module 419 determines which known parking bay of a set of known parking bays at a pick-up location site 100 corresponds to the first camera 110' identified by the fiducial detection module 409 as having been exposed to the first fiducial marker 1200. In certain embodiments, discussed with respect to FIG. 6, the device registration module 419 receives a selection of the specific parking bay from the concierge tool 302, which the device registration module 419 uses in its determination. In other embodiments, discussed with respect to FIG. 7, the device registration module 419 receives data embedded within the fiducial image 1200, which the device registration module 419 uses in its determination. Whichever method the device registration module 419 uses, discussed below, the device registration module 419 ultimately gains knowledge of the known physical location that corresponds to the first camera 110' that was exposed to the first fiducial marker 1200.

At step 512, the device registration module 419 automatically associates the first camera 110' (being the camera that was exposed to the fiducial marker 1200) with the first known physical location. The device registration module 419 may save the association within a lookup table or other database structure that cross-references the cameras 110 (or other network devices) to their known physical locations of interest. Other methods of memorializing the association are possible, as well.

At step 514, after having automatically associated the first camera 110' with the first known physical location, the device registration module 419 associates subsequent images from the first camera 110' with the first known physical location. These subsequent images can be used for other purposes such as, for example, ALPR processes, which are discussed in steps 516, 518, and 520.

Figure 14:
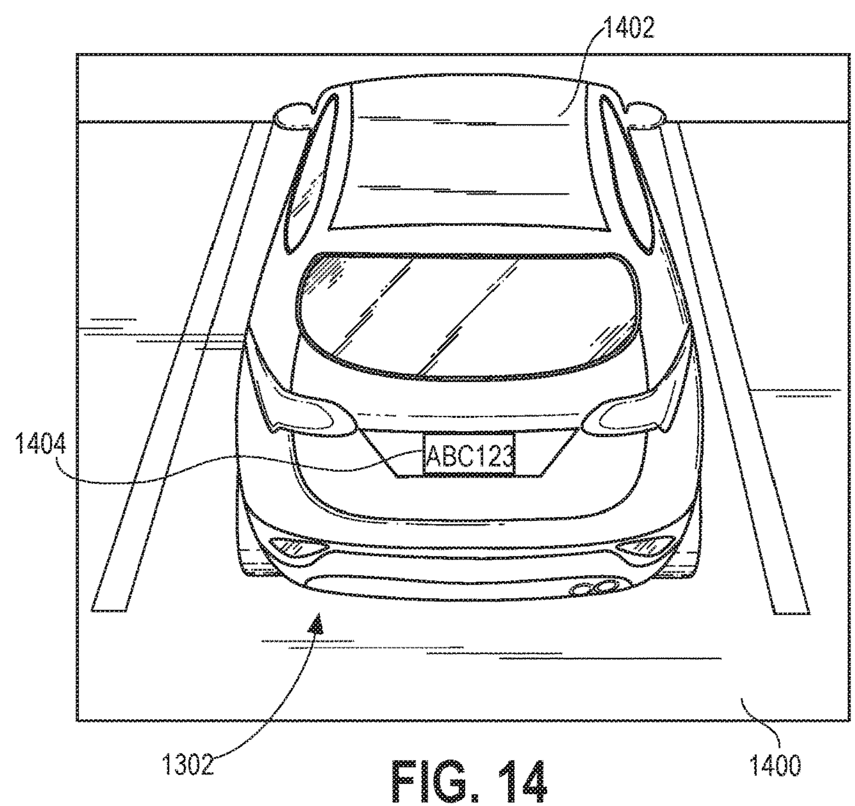
FIG. 14 is a subsequent second image from the first camera in accordance with various embodiments.

At step 516, the first camera 110' captures a second image 1400 including a license plate 1404. FIG. 14 shows a subsequent second image 1400 from the first camera 110'. The second image 1400 includes the same field of view as the first image 1300, but taken at a later time when a vehicle 1402, including a license plate 1404, has parked in the parking bay 1302. At step 518, the ALPR module 410 performs an ALPR process on the second image to determine a license plate identification of the license plate 1404. At step 520, the device registration module 419 associates the license plate identification with the first known location. Thus, the system knows that the identified vehicle is located in a particular parking bay and the concierge can service the customer accordingly.

Figure 6:
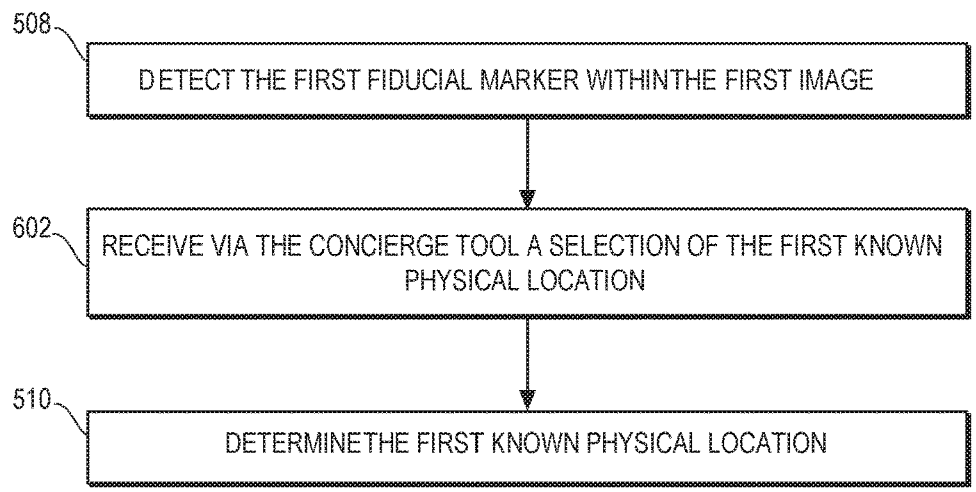
FIG. 6 is another example flow diagram of logic to determine a particular known physical location to associate with a camera in accordance with various embodiments.

FIG. 6 shows another example flow diagram of logic 600 to enable the device registration module 419 to determine the particular known physical location (e.g., parking bay), in accordance with various embodiments. As discussed above, at step 508, the servers 304, and specifically the fiducial detection module 409 detects the first fiducial marker 1200 within the first image. Then, after detection of the fiducial marker 1200, the concierge tool 302 via the GUI 1100 may provide the user with a notification of successful fiducial marker detection by the camera. For example, the concierge tool 302 may output a sound or message. The concierge tool 302 may provide a reference image 1108 provided by the first camera 110' that was exposed to the fiducial marker 1200. The concierge tool 302, via the GUI 1100, may then enable the user to provide an input as to which known physical location (e.g., parking bay) the first camera 110' should be associated with via buttons 1106. The user selects one of the buttons 1106 and the concierge tool 302 sends, and the concierge tool interface 416 receives, the selection of the first known physical location to be associated with the first camera 110'. With the received selection from the concierge tool 302, the device registration module 419 can then determine the first known physical location to be associated with the first camera 110' in step 510, as discussed above.

Figure 7:
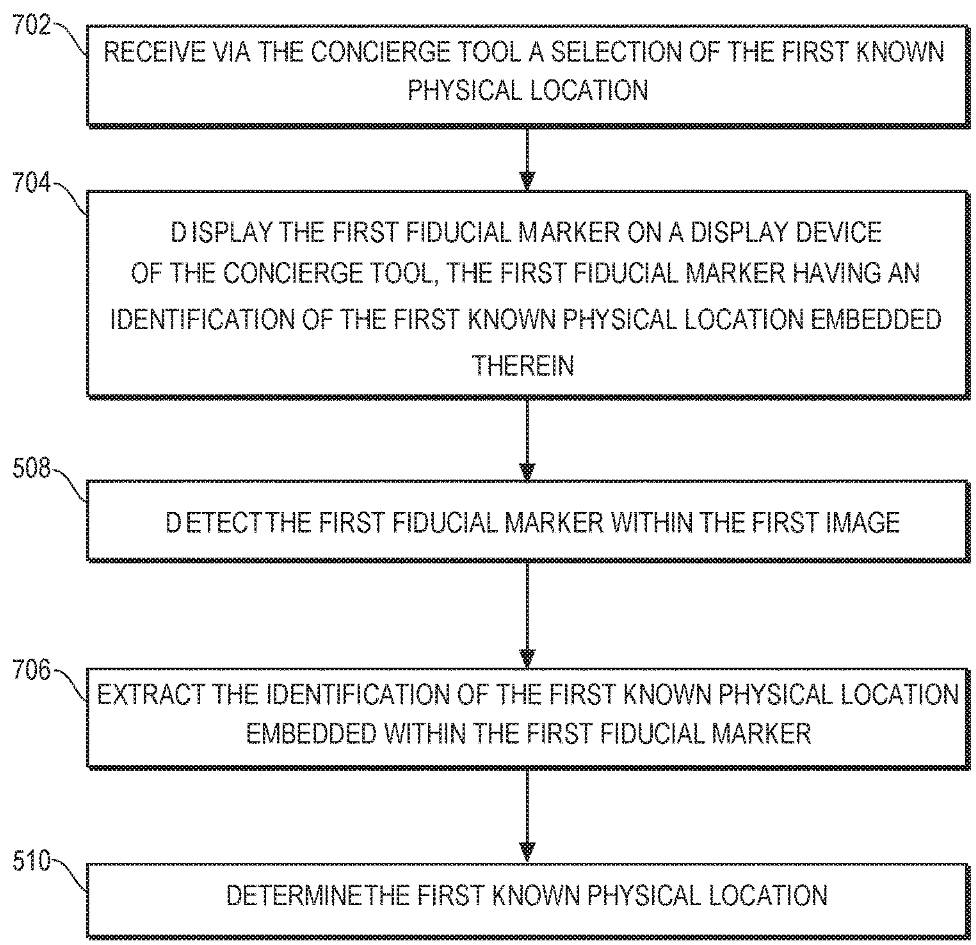
FIG. 7 is an alternative example flow diagram of logic to determine the particular known physical location to associate with a camera in accordance with various other embodiments.

FIG. 7 shows an alternative example flow diagram of logic 700 to enable the device registration module 419 to determine the particular known physical location (e.g., parking bay), in accordance with various other embodiments. At step 702, in a similar manner to step 602, a user may provide an input as to which known physical location (e.g., parking bay) the first camera 110' should be associated with via buttons 1106. However, unlike step 602 in FIG. 6, step 702 in FIG. 7 occurs prior to displaying the fiducial marker 1200. After the concierge tool 302 receives the selection of the known physical location at step 704, in one approach, the concierge tool 302 creates or selects the first fiducial marker 1200 such that it has embedded therein an identification of the first known location as selected by the user. For example, the embedded identification within the fiducial marker 1200 may include simply a numerical identification that represents the known physical location (e.g., numerical value "3" corresponding to parking bay 3). Alternatively, more descriptive data may be embedded within the fiducial marker 1200 (e.g., "parking bay 3") if, for example, a QR code is used, which can typically include more data than can an AR code. Once the specific fiducial marker 1200 is generated or selected, the concierge tool 302 displays it on its display device 1102. As discussed above, at step 508, the fiducial marker 1200 is detected within the first image.

At step 706, the servers 304, and more particularly the fiducial detection module 409, extracts the identification of the first known location from the first fiducial marker 1200 in the first image. The fiducial detection module 409 then sends the extracted identification to the device registration module 419. At step 510, as before, the device registration module 419 determines the first known physical location by associating the first camera 110' with the received identification of the known physical location.

Figure 8:
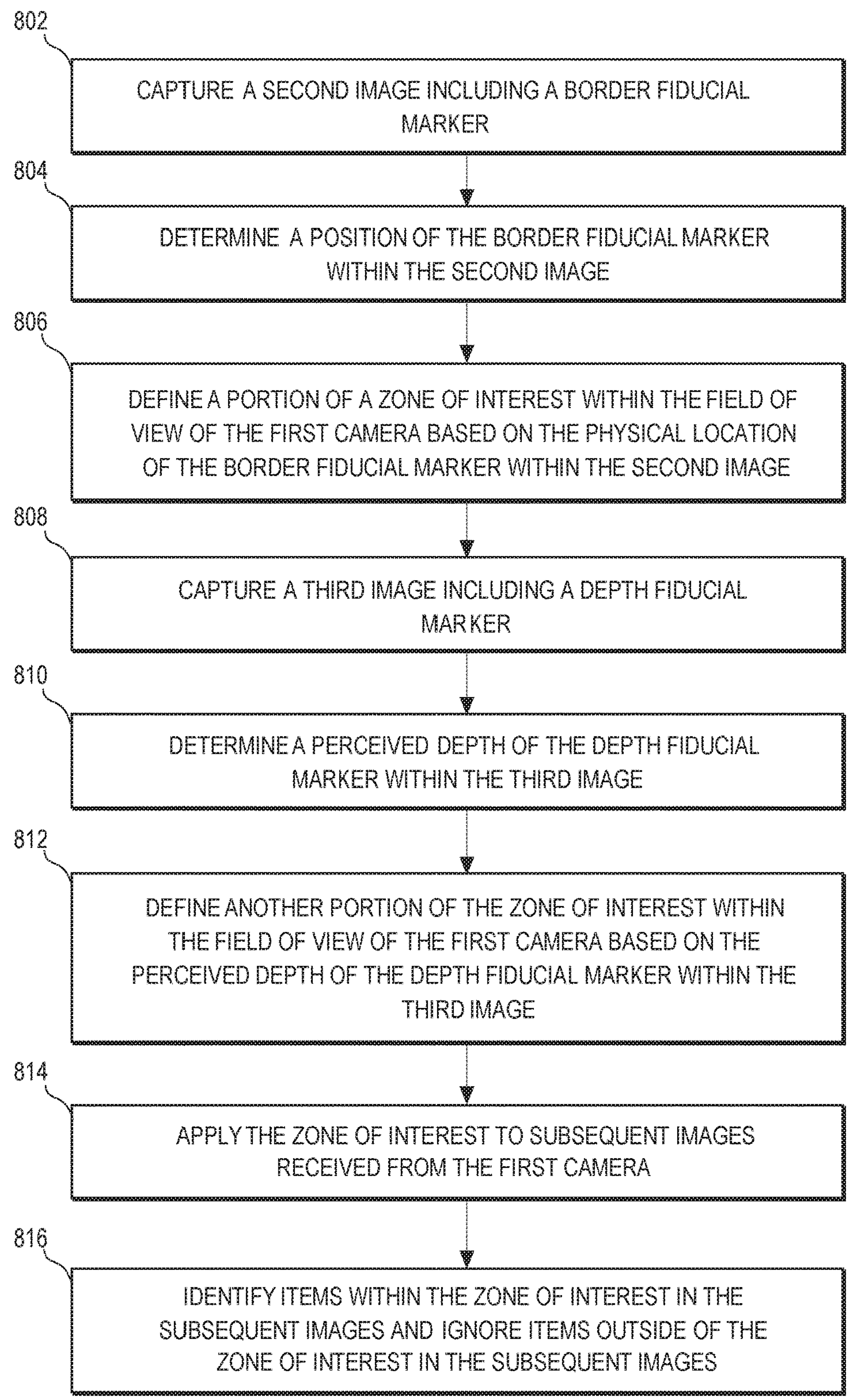
FIG. 8 is an example flow diagram of logic for defining a zone of interest within an image in accordance with various other embodiments.
Figure 15:
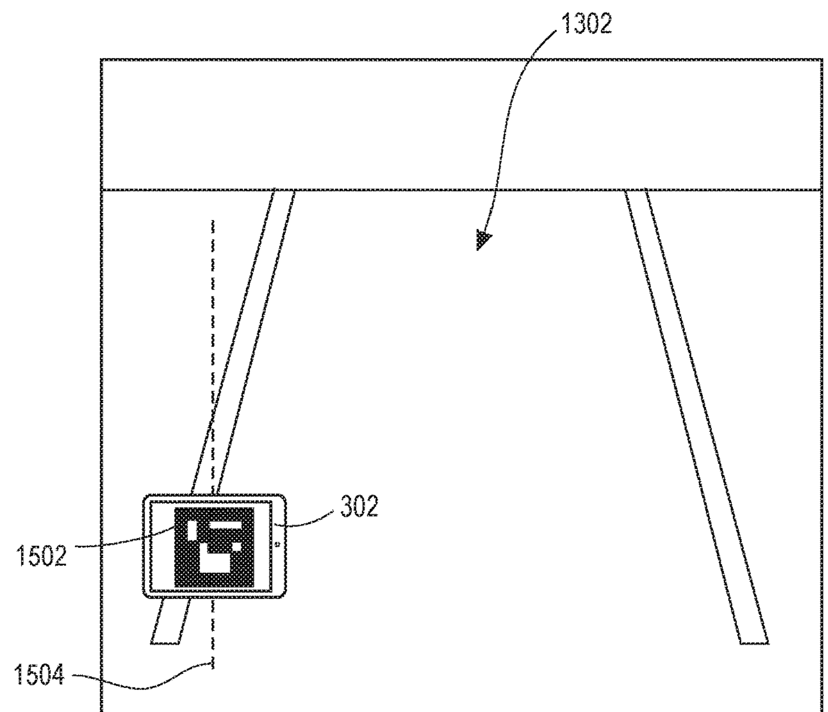
FIG. 15 is another example image from the first camera in accordance with various embodiments.

FIG. 8 shows an example flow diagram of logic 800 for defining a zone of interest within an image in accordance with various other embodiments. If the field of view for a camera encompasses an area greater than is needed or wanted for a particular application setting, a zone of interest can be established that is smaller than the field of view. In various embodiments, the fiducial detection module 409 can track the position of a fiducial marker 1200 within an image. The fiducial detection module 409 can then use these tracked positions to establish borders of a zone of interest. Items (e.g., license plates) that appear in the image within the zone of interest can be detected or recognized, while items that appear outside of the zone of interest can be ignored. At step 802, the first camera 110' captures a second image 1500. An example second image 1500 is shown in FIG. 15. The second image 1500 includes a border fiducial marker 1502, which may be the same as the first fiducial marker 1200 or different from the first fiducial marker 1200 (e.g., a different AR code identifying it as a border fiducial border marker). A user may present the concierge tool 302 with the border fiducial marker 1502 displayed thereon to the first camera 110'. The user may move the border fiducial marker 1502 to an edge of an area where the user would like to define a zone of interest. In this example, the user moved the border fiducial marker 1502 near the left edge of the parking bay 1302.

Figure 16:
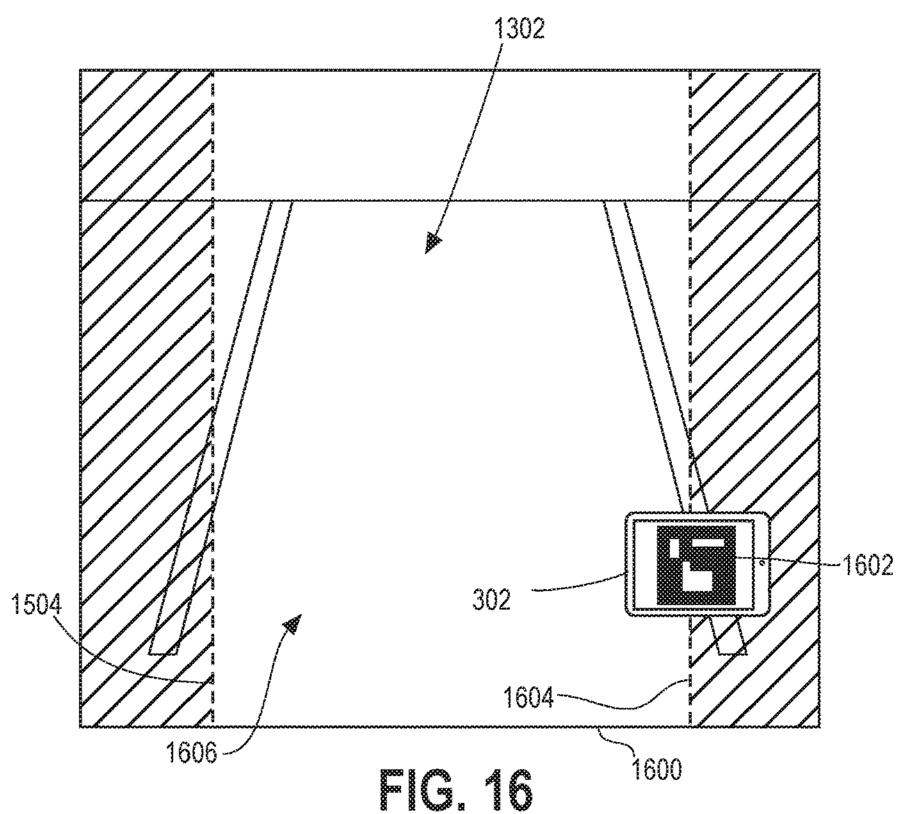
FIG. 16 is another example image from the first camera in accordance with various embodiments.

At step 804, the fiducial detection module 409 detects the border fiducial marker 1502 in the second image 1500 and determines the position of the border fiducial marker 1502 within the second image 1500. At step 806, the fiducial detection module 409 defines a portion of a zone of interest 1606 (see FIG. 16) within the field of view of the first camera 110' based on the position of the border fiducial marker 1502 within the second image 1500. For example, in FIG. 15, a first border 1504 is defined as part of the zone of interest 1606. In one embodiment, the first border 1504 may be a vertical border spanning the vertical field of view of the camera; however, other suitable line shapes (e.g., curves, ellipses, non-perpendicular lines, or angled lines) may be appropriate in other application settings. The process at step 806 may be repeated to define other borders as well. FIG. 16 shows a second border 1604 being defined by the fiducial detection module 409 responsive to a second border fiducial marker 1602 (which may be the same or different from the first border fiducial marker 1502) presented on the concierge tool 302. In one embodiment, the zone of interest 1606 may be defined as the areas located between the first border 1504 and the second border 1604. The fiducial detection module 409 may then apply the zone of interest 1606 to subsequent images received from the first camera 110' such that the servers 304 identify items within the zone of interest 1606 in the subsequent images and do not identify items outside of the zone of interest 1606 in the subsequent images. In a more specific example, the fiducial detection module 409 may apply the zone of interest 1606 to images from the first camera 110' so that the ALPR module 410 does not detect license plates outside of the zone of interest 1606.

Figure 17:
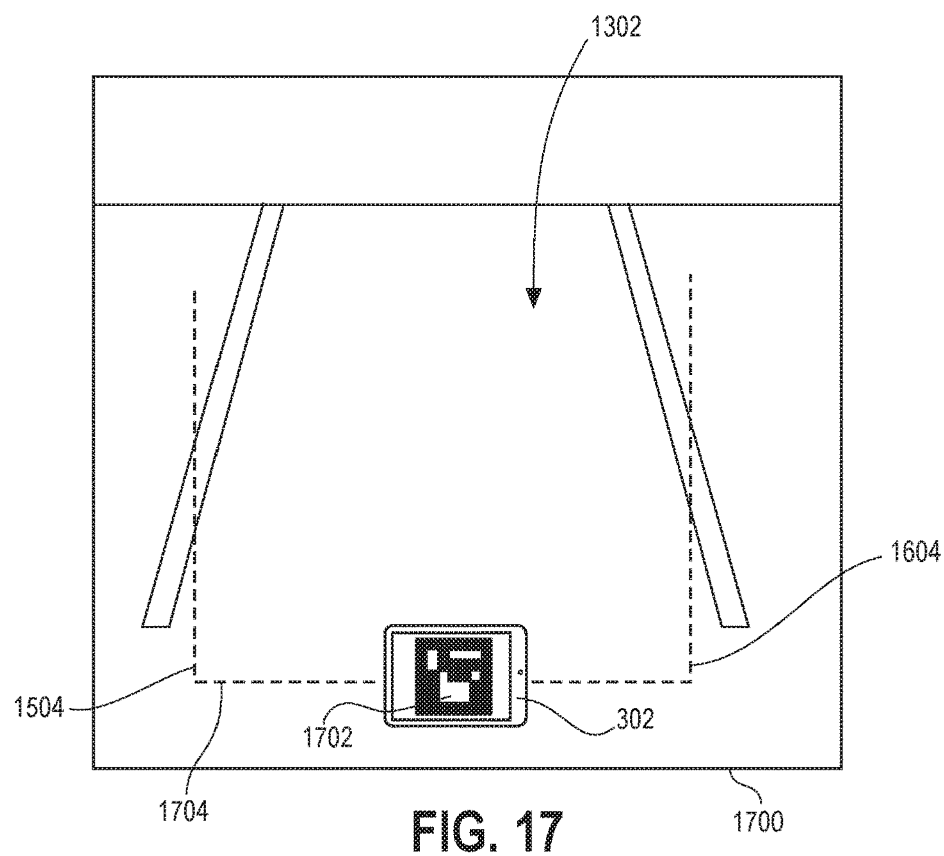
FIG. 17 is another example image from the first camera in accordance with various embodiments.

In some approaches, as is shown in FIG. 17, the fiducial detection module 409 can define a lower border 1704 as part of the zone of interest 1606. The concierge tool 302 displays a third border fiducial marker 1702 (which may be the same or different from the first border fiducial marker 1502 or the second border fiducial marker 1602). The user can present the third border fiducial marker 1702 to the first camera 110' in a physical location representative of the lower limit of the zone of interest 1606. The first camera 110' captures an image 1700 including the third border fiducial marker 1702. The fiducial detection module 409 detects the third border fiducial marker 1702 in the image 1700 and determines the position of the third border fiducial marker 1702 within the image 1700. The fiducial detection module 409 defines a portion of a zone of interest 1606 within the field of view of the first camera 110' based on the position of the third border fiducial marker 1702 within the image 1700. For example, in FIG. 17, the fiducial detection module 409 defines the lower border 1704 as part of the zone of interest 1606. In one embodiment, the lower border 1704 may be a horizontal border spanning the horizontal field of view of the first camera 110', or spanning between the first border 1504 and the second border 1604.

Figure 18:
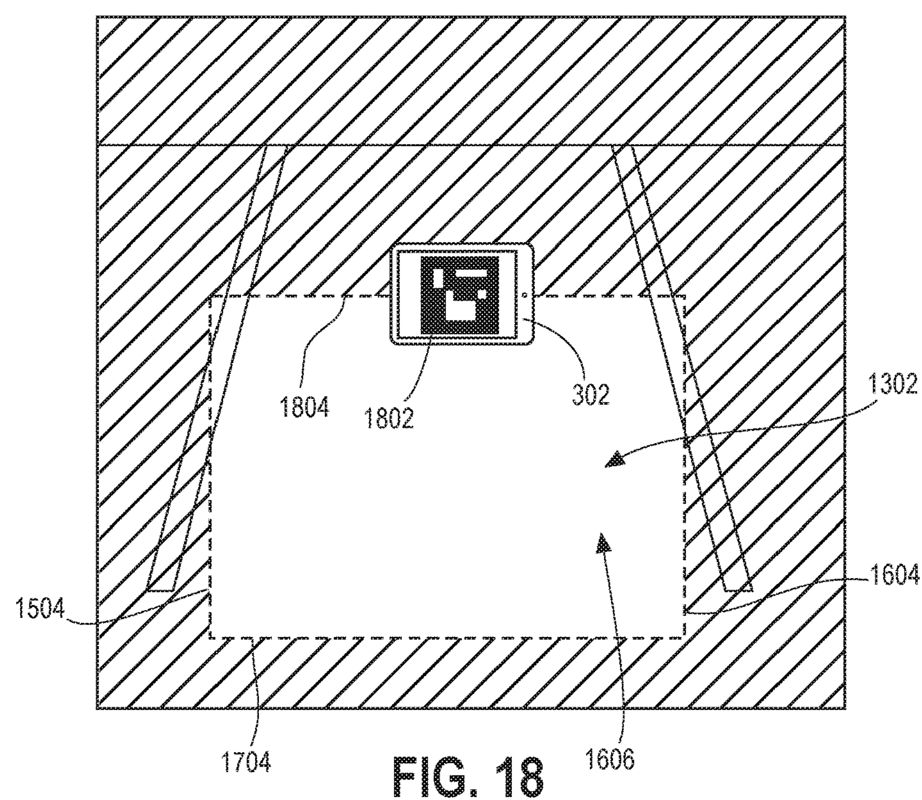
FIG. 18 is another example image from the first camera in accordance with various embodiments.

Similarly, as is shown in FIG. 18, fiducial detection module 409 can define an upper border 1804 as part of the zone of interest 1606. The concierge tool 302 displays a fourth border fiducial marker 1802 (which may be the same or different from any of the fiducial markers discussed above). The user can present the fourth border fiducial marker 1802 to the first camera 110' in a physical location representative of the upper limit of the zone of interest 1606. The first camera 110' captures an image 1800 including the fourth border fiducial marker 1802. The fiducial detection module 409 detects the fourth border fiducial marker 1802 in the image 1800 and determines the position of the fourth border fiducial marker 1802 within the image 1800. The fiducial detection module 409 defines a portion of a zone of interest 1606 within the field of view of the first camera 110' based on the position of the fourth border fiducial marker 1802 within the image 1800. For example, in FIG. 18, the fiducial detection module 409 defines the upper border 1804 as part of the zone of interest 1606. In one embodiment, the upper border 1804 may be a horizontal border spanning the horizontal field of view of the first camera 110', or spanning between the first border 1504 and the second border 1604. In this manner, the zone of interest 1606 may be more completely defined with a lower border 1704 and an upper border 1804 to further limit the zone of interest 1606. Other variations are possible.

Figure 19:
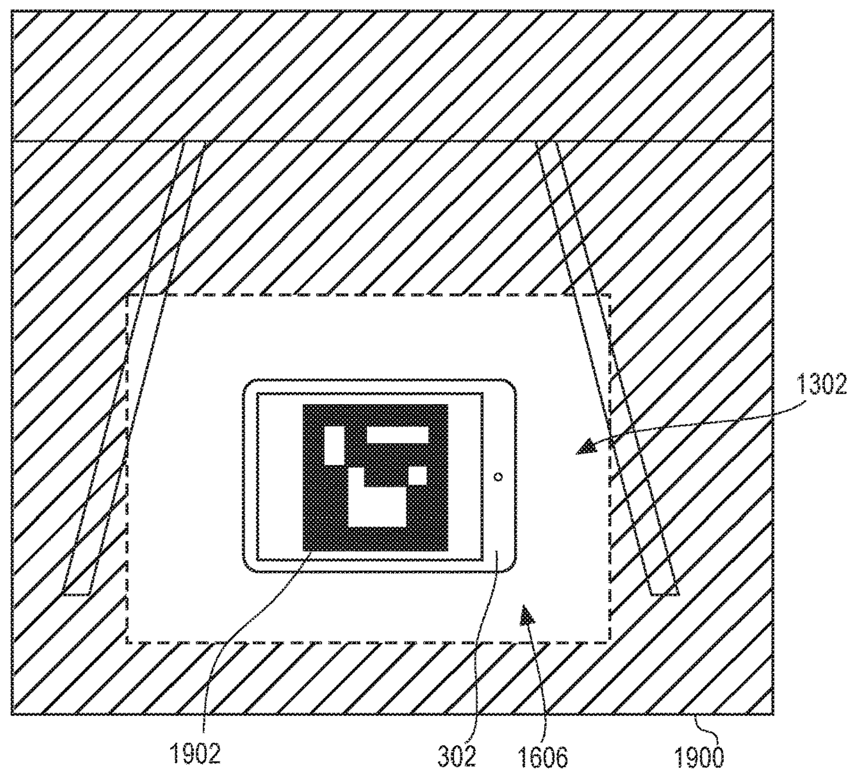
FIG. 19 is another example image from the first camera in accordance with various embodiments.
Figure 20:
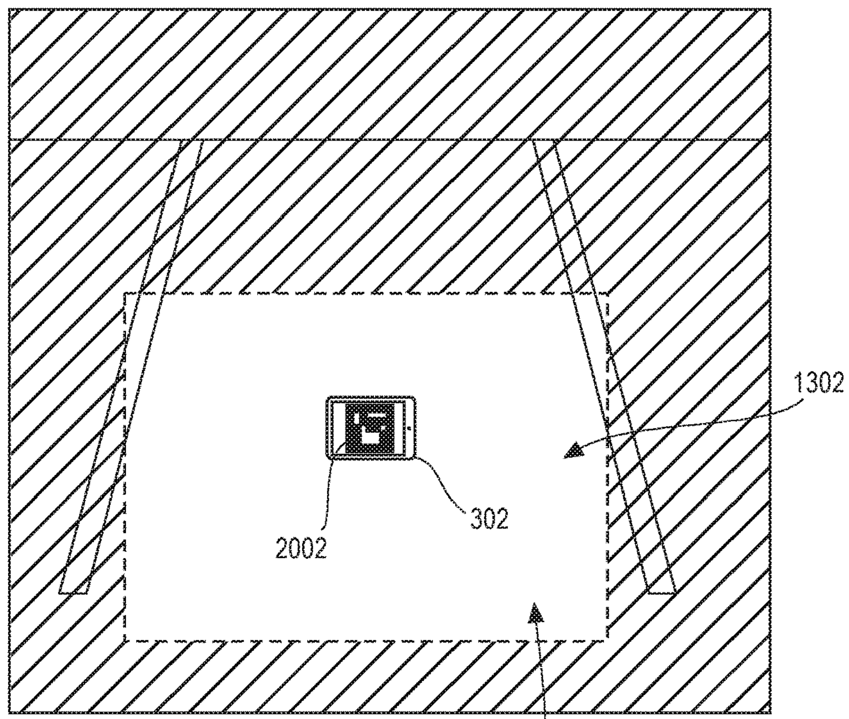
FIG. 20 is another example image from the first camera in accordance with various embodiments.

In another embodiment, the fiducial detection module 409 may utilize the depth of the fiducial marker within the image to establish a depth border of the zone of interest 1606. The examples in FIGS. 19 and 20 show the depth borders being established in tandem with the other borders discussed above; however, depth borders may also be established without regard to other borders or with regard to only some of the other borders. To establish depth borders, at step 808, the first camera 110' captures a third image 1900 including a first depth fiducial marker 1902. The first depth fiducial marker 1902 may be the same as or different from and of the other fiducial markers discussed above. In the third image 1900, the fiducial detection module 409 detects that the depth fiducial marker 1902 is closer to the first camera 110'. In step 810, the fiducial detection module 409 determines a perceived depth of the depth fiducial marker 1902 within the third image 1900. The fiducial detection module 409 can measure the width and/or height of the first depth fiducial marker 1902 within the third image 1900. With a known focal length setting on the first camera 110' and a known physical size of the display of the first depth fiducial marker 1902 on the concierge tool 302, the fiducial detection module 409 can calculate the depth of the first depth fiducial marker 1902 within the field of view of the first camera 110'. Other methods may be utilized to determine the depth of the first depth fiducial marker 1902 within the field of view of the first camera 110', including, for example, determining a focal range in which the first depth fiducial marker 1902 exists. At step 812, the fiducial detection module 409 defines a near depth border, which defines a near depth limit of the zone of interest 1606 within the field of view of the first camera 110' based on the perceived depth of the first depth fiducial marker 1702 within the third image.

The fiducial detection module 409 can repeat the steps in 808, 810, and 812 with a second depth fiducial marker 2002, which may be the same or different from the first depth fiducial marker 1902. FIG. 20 shows the second depth fiducial marker 2002 presented at a further depth than the first depth fiducial marker 1902 was presented in FIG. 19. For example, the second depth fiducial marker 2002 is shown as smaller than the first depth fiducial marker 1902 because it is further from the first camera 110'. In this manner, the fiducial detection module 409 can establish a far depth border to define a far depth limit of the zone of interest 1606 within the field of view of the first camera 110' based on the perceived depth of the second depth fiducial marker 2002 within the image.

At step 814, the fiducial detection module 409 may then apply the zone of interest 1606 to subsequent images received from the first camera 110'. At step 816, the servers 304 identify items within the zone of interest 1606 in the subsequent images and do not identify items outside of the zone of interest 1606 in the subsequent images. In a more specific example, the fiducial detection module 409 may apply the zone of interest 1606 to images from the first camera 110' so that the ALPR module 410 does not detect license plates outside of the zone of interest 1606. The borders (e.g., first border 1504 and second border 1604, and/or others) prevent the ALPR module 410 from identifying license plates that are outside of a two-dimensional boundary within the image. Additionally, the near depth border and the far depth border prevent the ALPR module 410 from identifying license plates outside of a third-dimension limit (i.e., a depth range) to prevent the ALPR module 410 from reading license plates that are too close (e.g., as a vehicle passes between the first camera 110' and the parking bay 1302) or too far (e.g., vehicles driving by on a street on the far side of the parking bay 1302).

In various embodiments, the GUI 1100 may provide instructions to the user as to which boundary to set at which time, or may receive commands from the user to set each particular boundary at which time. The GUI 1100 may also provide, in the reference image 1108, a representation of the zone of interest 1606 while it is being defined or after it is defined. In an alternative embodiment, the GUI 1100 may provide the user with the ability to draw or edit boundaries or zones of interest shown in the reference image 1108.

Defining the physical limits or boundaries of the license plate reading process can be a difficult process when attempted in the virtual world. However, defining the physical boundaries by using physical placement of the boundaries (with the boundary fiducial markers and/or the depth fiducial markers) within the actual physical space provides for a more accurate and quicker zone of interest definition process. Further, the process does not require intricate knowledge of special software to achieve placement of the boundaries. Instead, anyone can simply decide where to place the boundaries within the actual physical space and expose the camera to the fiducial markers at those physical boundary locations to easily define the zone of interest.

Figure 9:
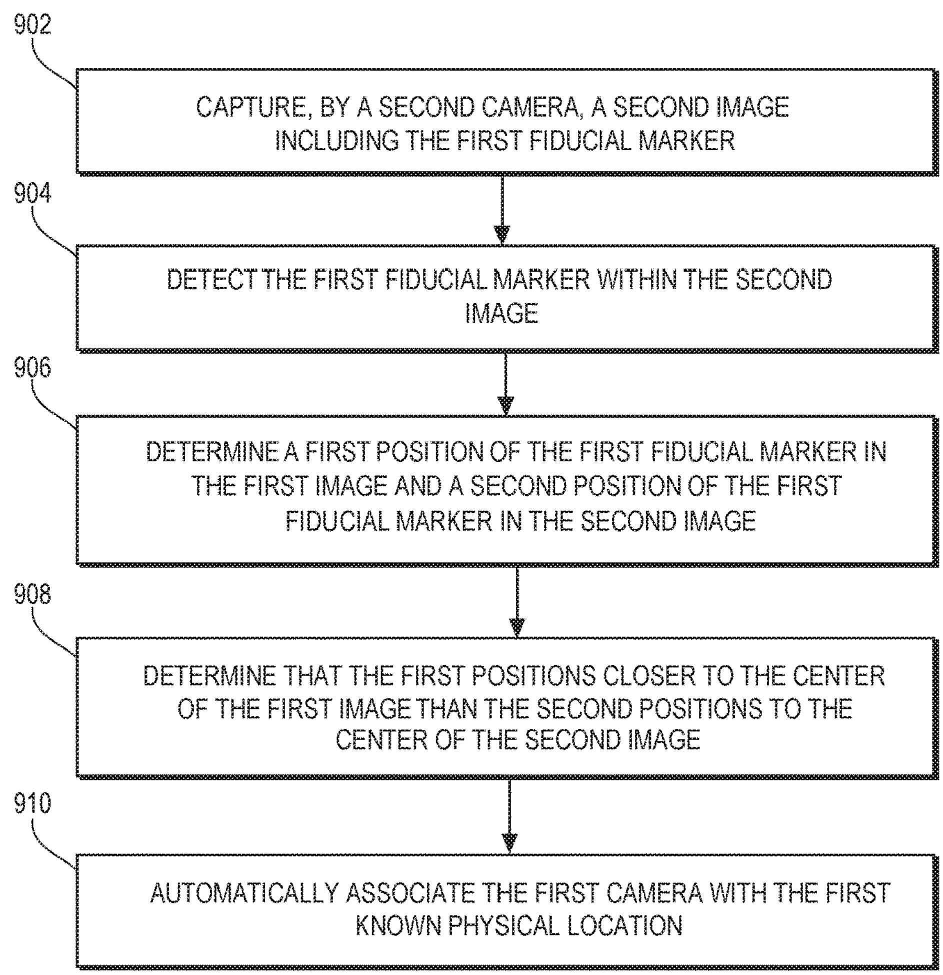
FIG. 9 is an example flow diagram of logic for dealing with conflicts when recognizing fiducial markers in accordance with various other embodiments.
Figure 21:
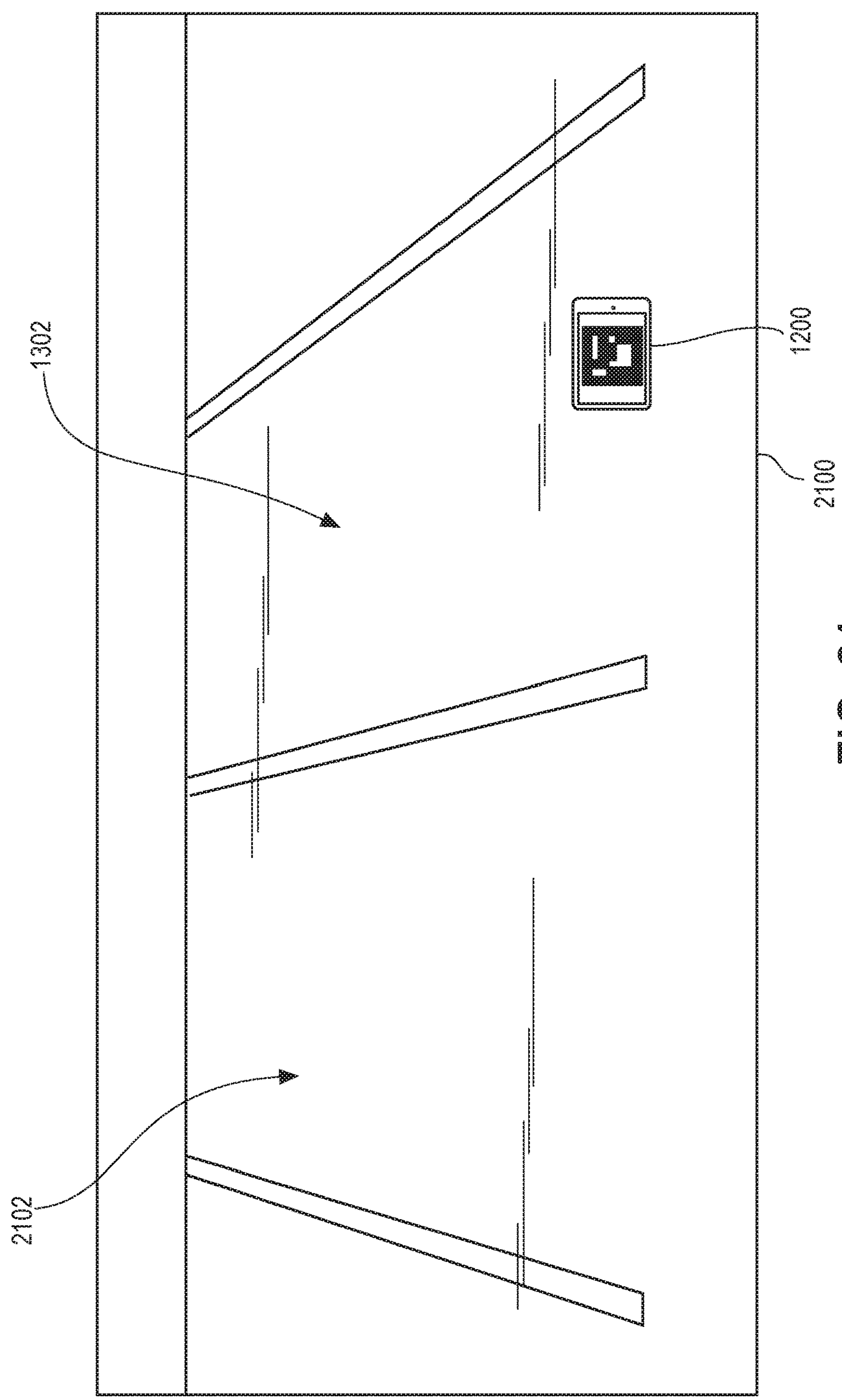
FIG. 21 is an example image from a second camera in accordance with various embodiments.

FIG. 9 shows an example flow diagram of logic 900 for dealing with conflicts in recognizing fiducial markers, in accordance with various other embodiments. At step 902, a second camera 110" captures a second image 2100, the second image including the first fiducial marker 1200. FIG. 21 shows another example second image 2100 of a second known location (e.g., a second parking bay 2102). The second image 1900 also includes a view of the neighboring first known location (e.g., the first parking bay 1302). The first fiducial marker 1200 displayed on the concierge tool 302 is displayed close to the first parking bay 1302. However, the second image 2100 from the second camera 110" also captures first fiducial marker 1200. Capturing the second image 2100 may occur at roughly the same time that the first camera 110' captures the first fiducial marker 1200 in step 506 (e.g., which may result in first image 1300 in FIG. 13). The second image 2100 from the second camera 110" may have a field of view that is too wide or is misaligned such that it is inadvertently exposed to the first fiducial marker 1200 while a user was trying to expose the first fiducial marker 1200 to the first camera 110'. Accordingly, at step 904, the fiducial detection module 409 detects the first fiducial marker 1200 within the second image 2100. In this situation, two different cameras detect the fiducial marker, which presents a problem for the system 400 in that the system must determine which camera was the intended target.

At step 906, the fiducial detection module 409 determines a first position of the first fiducial marker 1200 in the first image 1300. The fiducial detection module 409 also determines a second position of the first fiducial marker 1200 in the second image 2100. At step 908, the fiducial detection module 409 determines whether the first position is closer to the center of the first image 1300, or the second position is closer to the center of the second image 2100. In one approach, whichever image (1300 or 2100) has the fiducial marker 1200 closer to the center of their respective image is assumed to be the target camera. Thus, the fiducial detection module 409 selects the camera with the fiducial marker 1200 closest to the image center as the intended target camera. At step 910, as a result of the comparison, the device registration module 419 is configured to automatically associate the first camera 110' with the first known physical location instead of the second camera 110". In an alternative embodiment, the system 400 may also present to the concierge user, via the concierge tool 302, one or more images from each camera that recognizes the fiducial marker 1200 (e.g., from the first camera 110' and the second camera 110"). These different images may be presented to the concierge via the GUI 1100 on the concierge tool 302, for example as one or more reference images 1108. The concierge tool 302 can then receive a selection from the concierge of the image from the proper camera that the concierge knows they are trying to configure. The system 400 can in turn configure the selected camera as described herein.

Figure 10:
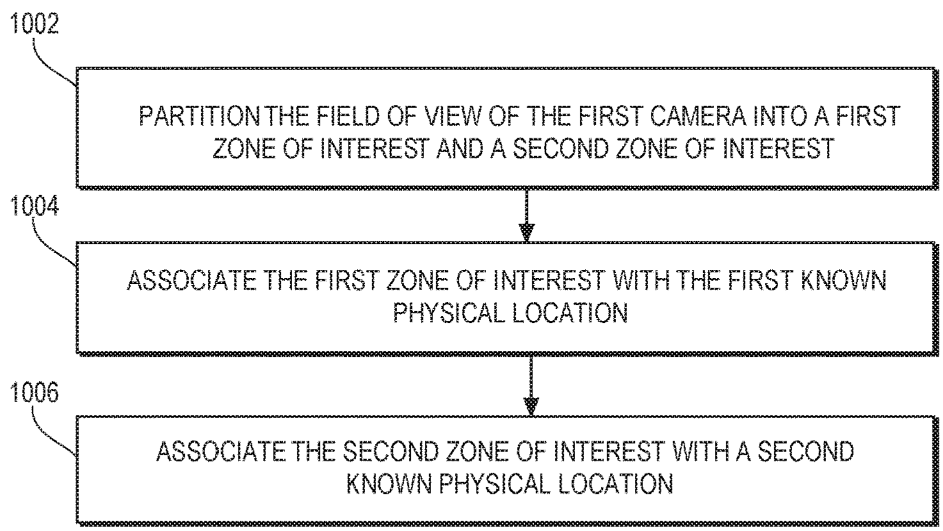
FIG. 10 is an example flow diagram of logic for partitioning a field of view of a camera in accordance with various other embodiments.
Figure 22:
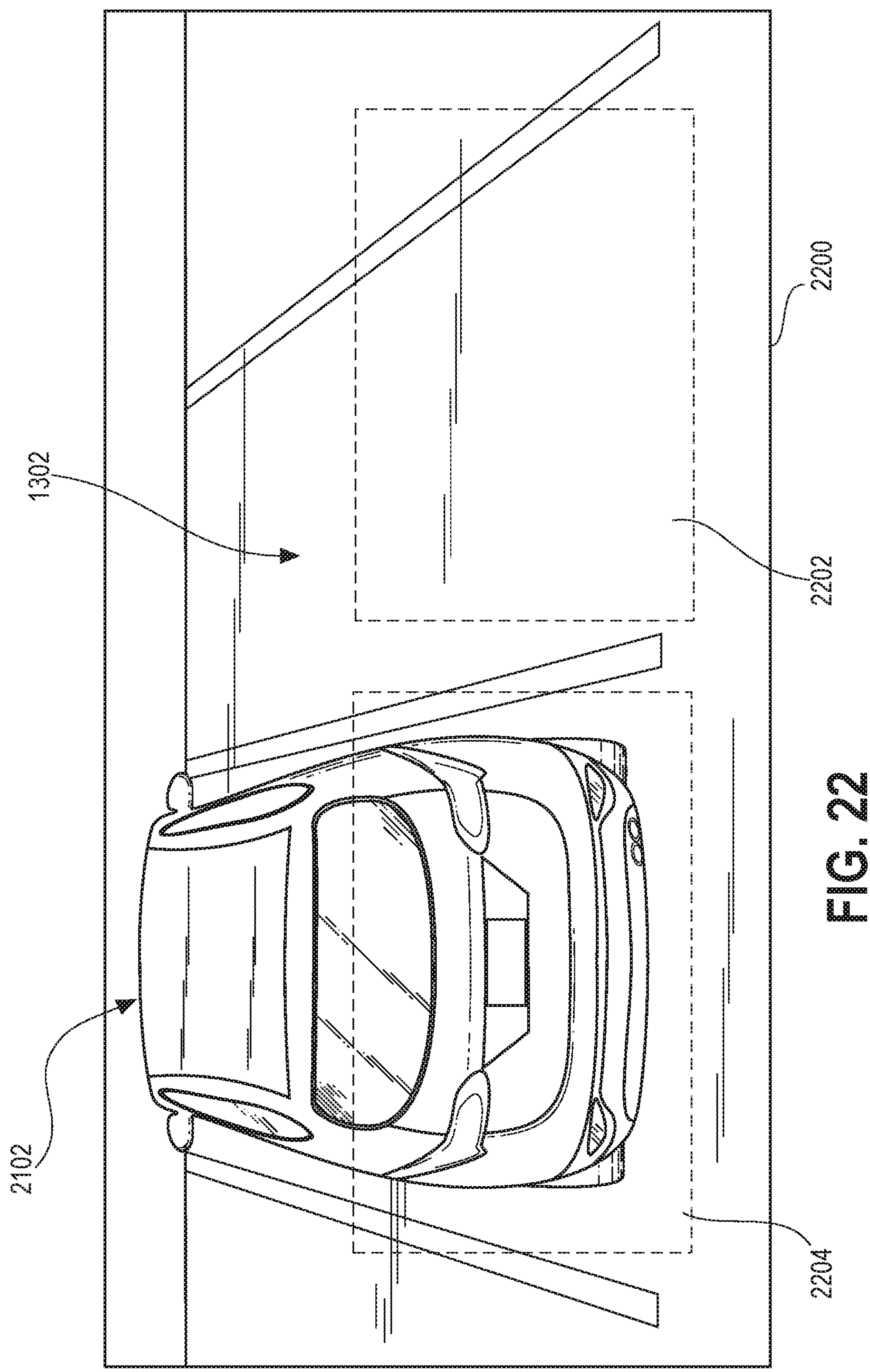
FIG. 22 is another example image from the first camera in accordance with various embodiments.

FIG. 10 shows an example flow diagram of logic 1000 for partitioning a field of view of a camera 110 in accordance with various other embodiments. There may be situations where a single camera 110 is utilized to monitor two known locations. With reference to FIG. 22, which shows a field of view 2200 from a camera 110 (e.g., the first camera 110') viewing two separate known physical locations: a first known physical location (e.g., first parking bay 1302) and a second known physical location (e.g., second parking bay 2102). To associate multiple specific locations within a field of view of the camera 110 to camera detection events (e.g., ALPR results), at step 1002, the fiducial detection module 409 can partition the field of view 2200 of the first camera 110' into a first zone of interest 2202 and a second zone of interest 2204. At step 1004, the device registration module 419 associates the first zone of interest 2202 with the first known physical location 1302 and, at step 1006, associates the second zone of interest 2204 with the second known physical location 2102 of the plurality of known physical locations. In one embodiment, a user may define the two separate zones of interest in accordance with the teachings disclosed herein.

In certain embodiments, the teachings disclosed herein may be employed to also configure the proximity sensors 114. For example, the system 400 may utilize similar teachings to associate proximity sensors 114 or other devices with known physical locations (e.g., parking bays).

So configured, a user is able to easily place network devices such as cameras 110 into a configuration mode and assign the devices to a particular known physical location. Further, once in configuration mode, the user is able to quickly and easily define physical boundaries within the known physical location without specific software training or knowhow.

The above method steps in FIGS. 5-10 are described with respect to execution by one or more of the elements illustrated in FIGS. 3 and 4. Although only one element may be mentioned with respect to execution of the above-mentioned steps, it is understood that other entities may execute the steps instead. For example, many steps that are discussed as being executed by the customer identification module 418 may be instead executed by the order processing module 414, the concierge tool interface 416, the vehicle detection server 406, the ALPR module 410, and/or the proximity interface module 412, or vice versa. Additionally, it is understood that the various elements in FIGS. 3 and 4 are configured to execute the above-mentioned method steps. As discussed above, the various elements may include system circuitry 306, such as programmed processors 308 and corresponding memory 310, which is programmed to execute instructions 312 such that the system circuitry 306 is configured to provide the above-mentioned functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. One skilled in the art will realize that a virtually unlimited number of variations to the above descriptions are possible, and that the examples and the accompanying figures are merely to illustrate one or more examples of implementations. It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it is understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

Various implementations have been specifically described. However, many other implementations are also possible.

What is claimed is:

1. A method of assigning a camera to a parking bay, the method comprising:

receiving, by a server, from a concierge tool implemented on a portable computing device, a command to enter a camera configuration mode;

instructing the concierge tool, by the server, to display a first fiducial marker on a display of the portable computing device;

receiving, by the server from a first camera of a plurality of cameras communicatively coupled with the server, a first image, the first image captured, with the first camera and showing at least a portion of the display;

detecting, by the server, that the first fiducial marker is shown within the first image;

selecting, by the server, the first camera from the plurality of cameras as a potential camera to be associated with a first parking bay based at least in part on the detecting;

receiving, by the server from the concierge tool, a selection of the first parking bay; and automatically associating, by the server, the first camera with the first parking bay based at least in part on selecting the first camera and receiving the selection of the first parking bay from the concierge tool.

2. The method of claim 1 further comprising:

after automatically associating the first camera with the first parking bay:

receiving, by the server from the first camera, a second image captured with the first camera, the second image including a license plate;

performing, by the server, an automatic license plate recognition (ALPR) process on the second image to determine a license plate identification of the license plate; and associating, by the server, the license plate identification with the first parking bay.

3. The method of claim 1 further comprising:

instructing the concierge tool, by the server, to display at least one of an augmented reality (AR) code or a quick response (QR) code on the display of the portable computing device as the first fiducial marker.

4. The method of claim 1 further comprising:

receiving, by the server from the first camera, a second image captured with the first camera, the second image including a border fiducial marker, the border fiducial marker comprising at least one of the first fiducial marker or a second fiducial marker;

determining, by the server, a physical location of the border fiducial marker within the second image;

defining, by the server, at least a portion of a zone of interest within a field of view of the first camera based on the physical location of the border fiducial marker within the second image; and applying, by the server, the zone of interest to subsequent images received from the first camera such that the server identifies items within the zone of interest in the subsequent images and does not identify items outside of the zone of interest in the subsequent images.

5. A method of configuring a camera, the method comprising:

receiving, by a server, from a portable computing device, a command to enter a camera configuration mode;

instructing the portable computing device, by the server, to display a first fiducial marker on a display of the portable computing device;

receiving, by the server from a first camera of a plurality of cameras communicatively coupled with the server, a first image captured by the first camera, the first image showing at least a portion of a field of view of the first camera including a first known physical location and the first fiducial marker;

detecting, by the server, that the first fiducial marker is shown within the first image;

determining, by the server, the first known physical location from a plurality of known physical locations;

automatically associating, by the server, the first camera with the first known physical location based at least in part on the detecting of the first fiducial marker and the determining of the first known physical location; and associating, by the server, subsequent images from the first camera with the first known physical location based at least in part on automatically associating the first camera with the first known physical location.

6. The method of claim 5 wherein determining the first known physical location of a plurality of known physical locations comprises receiving, by the server, from a concierge tool implemented on the portable computing device, a selection of the first known physical location.

7. The method of claim 5, further comprising:

determining the first known physical location of the plurality of known physical locations by extracting, by the server, an identification of the first known physical location embedded within the first fiducial marker within the first image.

8. The method of claim 5, further comprising:

after automatically associating the first camera with the first known physical location:

receiving, by the server from the first camera, a second image captured with the first camera, the second image including a license plate;

performing, by the server, an automatic license plate recognition (ALPR) process on the second image to determine a license plate identification of the license plate; and associating, by the server, the license plate identification with the first known physical location.

9. The method of claim 5, further comprising:

receiving, by the server from a second camera of the plurality of cameras communicatively coupled with the server, a second image captured by the second camera, the second image including the first fiducial marker;

detecting, by the server, the first fiducial marker within the second image;

determining, by the server, a first position of the first fiducial marker in the first image and a second position of the first fiducial marker in the second image;

determining, by the server, that the first position is closer to a center of the first image than the second position is to the center of the second image; and automatically associating, by the server, the first camera with the first known physical location in response to determining that the first position is closer to the center of the first image than the second position is to the center of the second image.

10. The method of claim 5, further comprising:

partitioning, by the server, the field of view of the first camera into a first zone of interest and a second zone of interest;

associating, by the server, the first zone of interest with the first known physical location; and associating, by the server, the second zone of interest with a second known physical location of the plurality of known physical locations.

11. The method of claim 5, further comprising:

receiving, by the server from the first camera, a second image captured by the first camera, the second image including a border fiducial marker, the border fiducial marker comprising at least one of the first fiducial marker or a second fiducial marker;

determining, by the server, a position of the border fiducial marker within the second image;

defining, by the server, at least a portion of a zone of interest within a field of view of the first camera based on the position of the border fiducial marker within the second image; and applying, by the server, the zone of interest to subsequent images received from the first camera such that the server identifies items within the zone of interest in the subsequent images and does not identify items outside of the zone of interest in the subsequent images.

12. The method of claim 11, further comprising:

receiving, by the server from the first camera, a third image captured by the first camera, the third image including a depth fiducial marker, the depth fiducial marker comprising at least one of the first fiducial marker, the border fiducial marker, or a different fiducial marker;

determining, by the server, a perceived depth of the depth fiducial marker within the third image; and defining, by the server, at least another portion of the zone of interest within the field of view of the first camera based on the perceived depth of the depth fiducial marker within the third image.

13. A system, comprising:

a portable computing device comprising a display and configured to present a first fiducial marker on the display based at least in part on instructions to display the first fiducial marker;

a first camera configured to capture a first image, the first image showing at least a portion of a field of view of the first camera including a first known physical location;

fiducial detection circuitry coupled to the first camera, the fiducial detection circuitry configured to detect that the first fiducial marker is shown within the first image;

device registration circuitry coupled to the fiducial detection circuitry, the device registration circuitry configured to:

determine the first known physical location from a plurality of known physical locations;

automatically associate the first camera with the first known physical location in response to the fiducial detection circuitry detecting that the first fiducial marker is shown within the first image and determining the first known physical location; and associate subsequent images from the first camera with the first known physical location.

14. The system of claim 13, further comprising:

receiving from a concierge tool implemented on the portable computing device, a selection of the first known physical location, wherein the device registration circuitry is further configured to determine the first known physical location from the selection of the first known physical location received from the concierge tool.

15. The system of claim 13, wherein the fiducial detection circuitry is further configured to extract an identification of the first known physical location embedded within the first fiducial marker within the first image, and wherein the device registration circuitry is further configured to determine the first known physical location from the identification of the first known physical location extracted from the first fiducial marker.

16. The system of claim 13, wherein the first camera is further configured to capture a second image including a license plate, wherein the system further comprises automatic license plate recognition (ALPR) circuitry coupled to the first camera, the ALPR circuitry configured to:

perform an automatic license plate recognition (ALPR) process on the second image to determine a license plate identification of the license plate, and wherein the device registration circuitry is further configured to, after automatically associating the first camera with the first known physical location, associate the license plate identification with the first known physical location.

17. The system of claim 13, further comprising:

a second camera coupled to the fiducial detection circuitry, the second camera configured to capture a second image, the second image including the first fiducial marker, wherein the fiducial detection circuitry is further configured to:

detect the first fiducial marker within the second image;

determine a first position of the first fiducial marker in the first image and a second position of the first fiducial marker in the second image; and determine that the first position is closer to a center of the first image than the second position is to a center of the second image, and wherein the device registration circuitry is further configured to automatically associate the first camera with the first known physical location in response to the fiducial detection circuitry determining that the first position is closer to the center of the first image than the second position is to the center of the second image.

18. The system of claim 13, wherein the fiducial detection circuitry is further configured to partition the field of view of the first camera into a first zone of interest and a second zone of interest, and wherein the device registration circuitry is further configured to:

associate the first zone of interest with the first known physical location;

and associate the second zone of interest with a second known physical location of the plurality of known physical locations.

19. The system of claim 13, wherein the first camera is further configured to capture a second image including a border fiducial marker, the border fiducial marker comprising at least one of the first fiducial marker or a second fiducial marker, wherein the fiducial detection circuitry is further configured to:

determine a position of the border fiducial marker within the second image;

define at least a portion of a zone of interest within a field of view of the first camera based on the position of the border fiducial marker within the second image; and apply the zone of interest to subsequent images received from the first camera such that items within the zone of interest in the subsequent images are identified and items outside of the zone of interest in the subsequent images are not identified.

20. The system of claim 19, wherein the first camera is further configured to capture a third image including a depth fiducial marker, the depth fiducial marker comprising at least one of the first fiducial marker, the border fiducial marker, or a different fiducial marker, wherein the fiducial detection circuitry is further configured to:

determine a perceived depth of the depth fiducial marker within the third image; and define at least another portion of the zone of interest within the field of view of the first camera based on the perceived depth of the depth fiducial marker within the third image.

* * * * *